US012356076B2

(12) United States Patent
Toyoda et al.

(10) Patent No.: US 12,356,076 B2
(45) Date of Patent: Jul. 8, 2025

(54) IMAGE CAPTURE CONTROL DEVICE, IMAGE CAPTURE DEVICE, IMAGE CAPTURE CONTROL METHOD, AND NON-TRANSITORY COMPUTER-READABLE STORAGE MEDIUM

(71) Applicant: CANON KABUSHIKI KAISHA, Tokyo (JP)

(72) Inventors: Takuya Toyoda, Kanagawa (JP); Masashi Nishiyama, Kanagawa (JP); Asuka Matsuoka, Kanagawa (JP); Tomoaki Komiyama, Kanagawa (JP); Fumihiko Kato, Kanagawa (JP); Koyo Sato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 75 days.

(21) Appl. No.: 18/316,497

(22) Filed: May 12, 2023

(65) Prior Publication Data

US 2023/0388641 A1 Nov. 30, 2023

(30) Foreign Application Priority Data

May 24, 2022 (JP) .................. 2022-084728
Jan. 24, 2023 (JP) .................. 2023-008954

(51) Int. Cl.
*H04N 23/695* (2023.01)
*H04N 23/611* (2023.01)

(52) U.S. Cl.
CPC ......... *H04N 23/695* (2023.01); *H04N 23/611* (2023.01)

(58) Field of Classification Search
None
See application file for complete search history.

(56) References Cited

U.S. PATENT DOCUMENTS

| 10,225,462 | B2 * | 3/2019 | Murakami | H04N 23/635 |
|---|---|---|---|---|
| 12,125,229 | B2 * | 10/2024 | Qian | G06T 7/70 |
| 2010/0074557 | A1 * | 3/2010 | Oku | G06V 10/25 382/298 |
| 2010/0182329 | A1 * | 7/2010 | Yamaguchi | G06T 13/40 345/474 |
| 2010/0321515 | A1 * | 12/2010 | Imamura | H04N 23/673 348/222.1 |
| 2011/0019021 | A1 * | 1/2011 | Yoshizumi | H04N 23/611 348/222.1 |
| 2014/0112530 | A1 * | 4/2014 | Yadani | G06V 40/10 382/103 |
| 2017/0078587 | A1 * | 3/2017 | Guo | G06T 7/246 |

(Continued)

FOREIGN PATENT DOCUMENTS

JP 2002-171438 A 6/2002

*Primary Examiner* — Stefan Gadomski
(74) *Attorney, Agent, or Firm* — Cowan, Liebowitz & Latman, P.C.

(57) ABSTRACT

There is provided with an image capture control device. An estimation unit estimates an orientation of the subject detected in an image captured by the image capture device. A region control unit sets a first region in an image capture range of the image capture device based on whether or not the estimated orientation of the subject is a predetermined orientation. An image capture control unit controls the image capture direction based on whether or not the subject is in the first region.

11 Claims, 20 Drawing Sheets

(56) References Cited

U.S. PATENT DOCUMENTS

| | | | | |
|---|---|---|---|---|
| 2017/0280045 | A1* | 9/2017 | Nonaka | H04N 23/673 |
| 2018/0307896 | A1* | 10/2018 | Tamura | G06V 40/168 |
| 2020/0117952 | A1* | 4/2020 | Carroll | G06V 20/52 |
| 2020/0322527 | A1* | 10/2020 | Orikasa | H04N 7/18 |
| 2021/0019921 | A1* | 1/2021 | Yoshida | G06T 11/001 |
| 2021/0029305 | A1* | 1/2021 | Tang | H04N 23/633 |
| 2021/0073564 | A1* | 3/2021 | Piao | G06T 7/73 |
| 2021/0103736 | A1* | 4/2021 | Toyoda | G06V 20/46 |
| 2021/0104069 | A1* | 4/2021 | Tahara | G06T 7/80 |
| 2021/0281766 | A1* | 9/2021 | Lu | G03B 13/36 |
| 2021/0337110 | A1* | 10/2021 | Kida | G06V 20/40 |
| 2021/0366076 | A1* | 11/2021 | He | G06V 10/764 |
| 2023/0007167 | A1* | 1/2023 | Usami | H04N 23/632 |
| 2023/0147088 | A1* | 5/2023 | Mochizuki | G06V 40/171 |
| | | | | 348/77 |
| 2023/0237676 | A1* | 7/2023 | Shinkawa | G06T 7/215 |
| | | | | 382/103 |
| 2024/0054804 | A1* | 2/2024 | Hirakawa | G06T 7/00 |
| 2024/0089580 | A1* | 3/2024 | Nomura | G06V 40/10 |
| 2024/0127479 | A1* | 4/2024 | Shimizu | G06T 7/80 |
| 2024/0303855 | A1* | 9/2024 | Pan | G06T 7/75 |
| 2024/0367603 | A1* | 11/2024 | Sakamoto | B60N 2/02 |

* cited by examiner

IMAGE CAPTURE CONTROL DEVICE, IMAGE CAPTURE DEVICE, IMAGE CAPTURE CONTROL METHOD, AND NON-TRANSITORY COMPUTER-READABLE STORAGE MEDIUM

BACKGROUND OF THE INVENTION

Field of the Invention

The present invention relates to an image capture control device, an image capture device, an image capture control method, and a non-transitory computer-readable storage medium.

Description of the Related Art

Conventionally, there has been a technique in which pan, tilt, and zoom (hereinafter referred to as "PTZ") of an image capture device are controlled according to the movement of a subject being tracked, and the image capture direction of the image capture device is controlled such that the subject appears in an image capture range of the image capture device. There is also a technique for setting a dead zone region in the image capture range of the image capture device such that the image capture control device does not perform unnecessary PTZ control on the image capture device when automatically tracking a subject using the image capture device. When the subject appears in the dead zone region, the image capture control device does not perform unnecessary PTZ control on the image capture device. However, when the subject in the dead zone region moves out of the dead zone region at a high speed, tracking of the subject by the image capture device may be delayed.

In consideration of the above problems, a technique has been proposed in which a fast-moving subject is tracked by not setting a dead zone region in the image capture range of the image capture device when the subject is moving fast (Japanese Patent Laid-Open No. 2002-171438).

SUMMARY OF THE INVENTION

According to the present invention, it is possible to provide an image capture control device capable of tracking a fast-moving subject with high accuracy while suppressing unnecessary PTZ control.

The present invention in its one aspect provides an image capture control device configured to control an image capture direction of an image capture device for capturing an image of a subject, comprising at least one processor, and at least one memory coupled to the at least one processor, the memory storing instructions that, when executed by the processor, cause the processor to act as estimation unit configured to estimate an orientation of the subject detected in an image captured by the image capture device, region control unit configured to set a first region in an image capture range of the image capture device based on whether or not the estimated orientation of the subject is a predetermined orientation, and image capture control unit configured to control the image capture direction based on whether or not the subject is in the first region.

The present invention in its one aspect provides an image capture control method configured to control an image capture direction of an image capture device for capturing an image of a subject, comprising estimating an orientation of the subject detected in an image captured by the image capture device, setting a first region in an image capture range of the image capture device based on whether or not the estimated orientation of the subject is a predetermined orientation, and controlling the image capture direction based on whether or not the subject is in the first region.

The present invention in its one aspect provides a non-transitory computer-readable storage medium storing instructions that, when executed by a computer, cause the computer to perform an image capture control method comprising estimating an orientation of the subject detected in an image captured by the image capture device, setting a first region in an image capture range of the image capture device based on whether or not the estimated orientation of the subject is a predetermined orientation, and controlling the image capture direction based on whether or not the subject is in the first region.

The present invention in its one aspect provides an image capture control device configured to control an image capture direction of an image capture device for capturing an image of a subject, comprising at least one processor, and at least one memory coupled to the at least one processor, the memory storing instructions that, when executed by the processor, cause the processor to act as estimation unit configured to estimate an orientation of the subject detected in an image captured by the image capture device, determination unit configured to determine whether or not the subject has started moving, based on orientation information of the subject, the orientation information being estimated by the estimation unit, and image capture control unit configured to control the image capture direction based on a determination result of the determination unit.

Further features of the present invention will become apparent from the following description of exemplary embodiments (with reference to the attached drawings).

DESCRIPTION OF THE EMBODIMENTS

Figure 1:
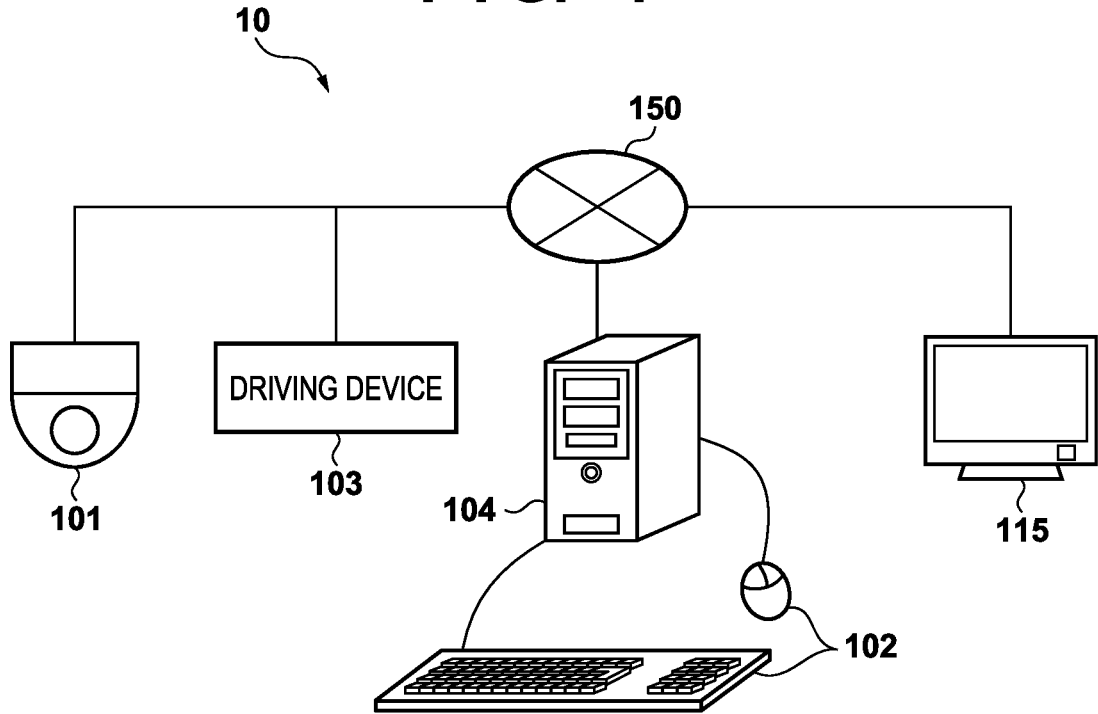
FIG. 1 is a diagram showing an overview of an image capture system according to a first embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a diagram showing an overview of an image capture system according to the first embodiment.

The image capture system 10 is a system for capturing an image of a subject. The image capture system 10 includes an image capture device 101, an input device 102, a driving device 103, an image capture control device 104, a display device 115, and a network 150. The image capture device 101, the input device 102, the driving device 103, and the image capture control device 104 are connected via a network 150. Also, the image capture control device 104 and the display device 115 are connected via a video interface.

The image capture system 10 tracks a subject based on video acquired from the image capture device 101 and subject tracking settings acquired from the input device 102. Also, the image capture control device 104 controls the image capture direction of the image capture device 101 via the driving device 103 such that the subject being tracked is captured within the image capture range of the image capture device 101. At this time, the image capture control device 104 changes the tracking setting according to the motion of the subject being tracked, whereby the subject can be tracked and captured even when the subject is moving at a high speed. Then, the image capture system 10 displays the video captured by the image capture device 101 on the display device 115.

The image capture device 101 is a device that captures an image of a subject while changing the image capture direction, and is, for example, a PTZ camera or a network camera. The image capture device 101 outputs the captured video to the image capture control device 104. Note that although there is one image capture device 101 in this embodiment, there may also be two or more.

The input device 102 is a device that receives a subject tracking setting from the user, and includes, for example, a GUI (Graphical User Interface) that operates on a web browser, a mouse, a keyboard, and buttons. The input device 102 outputs the subject tracking setting input by the user to the region setting unit 310, which will be described later. The tracking setting refers to setting a dead zone region in the image capture range of the image capture device 101.

The driving device 103 is a device that controls the image capture direction of the image capture device 101, and includes, for example, gears and motors for PTZ control. The driving device 103 drives the PTZ of the image capture device 101 based on PTZ control values received from a control unit 313, which will be described later.

The image capture control device 104 is a device that controls the image capture direction of the image capture device 101, and includes, for example, a PC, a smart phone, and a tablet. In this embodiment, the image capture device 101 and the image capture control device 104 exist independently of each other, but the image capture control device 104 may also be mounted on the image capture device 101. The image capture control device 104 performs subject tracking processing based on the subject position (for example, two-dimensional coordinates) detected from each of the still images that constitute the video, and the subject tracking settings. Here, the image capture control device 104 determines the motion (orientation) of the subject based on the result of estimating the orientation of the subject. If the image capture control device 104 determines that the subject is moving rapidly, the image capture control device 104 changes the setting of the dead zone region that has already been set in the image capture range. As a result, even if the subject moves rapidly, the image capture control device 104 can capture and track the subject without losing the subject.

Figure 2:
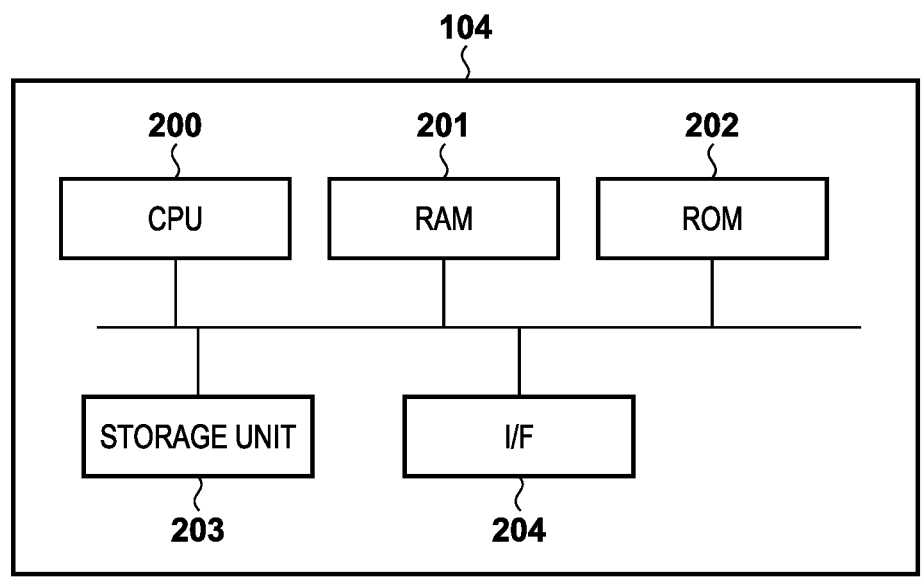
FIG. 2 is a diagram showing a hardware configuration of an image capture control device according to the first embodiment.

FIG. 2 is a diagram showing a hardware configuration of the image capture control device according to the first embodiment.

The image capture control device 104 includes a CPU 200, a RAM 201, a ROM 202, a storage unit 203, and an I/F 204.

The CPU 200 is a central processing unit and controls each device of the image capture system 10.

The RAM 201 is a memory for temporarily storing computer programs to be executed by the CPU 200, and is a volatile memory such as SRAM and DRAM, for example.

The ROM 202 is a memory that stores programs for the CPU 200 to control each device of the image capture system 10, and is, for example, a non-volatile memory such as EPROM.

The storage unit 203 is a device that stores programs and video data, and includes, for example, an HDD (Hard Disk Drive) and an SSD (Solid State Drive).

The I/F 204 is a device for transmitting and receiving data to and from each device of the image capture system 10. Also, the I/F 204 transmits and receives data to and from an external device (not shown) via the network 150.

Figure 3:
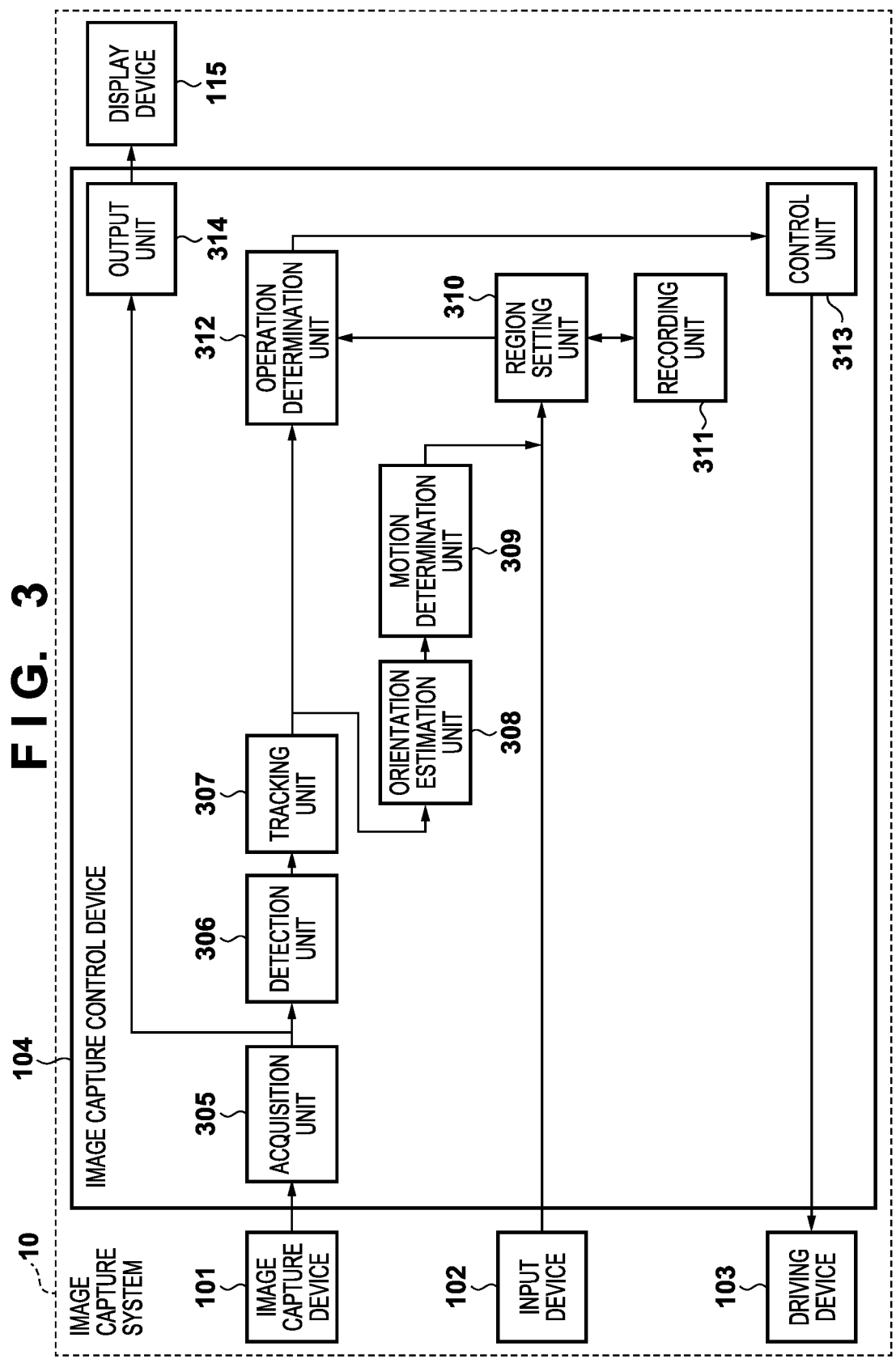
FIG. 3 is a diagram showing an example of a functional configuration of the image capture control device according to the first embodiment.

FIG. 3 is a diagram showing an example of the functional configuration of the image capture control device according to the first embodiment. The functions of the image capture control device 104 described below are realized by the CPU 200 executing a program stored in the ROM 202 or the like.

The image capture control device 104 includes an acquisition unit 305, a detection unit 306, a tracking unit 307, an orientation estimation unit 308, a motion determination unit 309, a region setting unit 310, a recording unit 311, an operation determination unit 312, a control unit 313, and an output unit 314.

The acquisition unit 305 acquires video from image capture device 101 and outputs the acquired video to the detection unit 306 and the output unit 314.

The detection unit 306 detects a subject from each image constituting the video based on a predetermined subject detection method. Subject detection methods include, but are not limited to, template matching and semantic segmentation. Since template matching and semantic segmentation are known techniques, their descriptions are omitted. The detection unit 306 outputs the position (e.g., two-dimensional coordinates) of the subject detected from the image to the tracking unit 307.

The tracking unit 307 tracks the subject based on the position of the subject detected in the image. If no subject is being tracked, the tracking unit 307 selects the subject to be tracked from among the subjects detected in the image, and starts tracking the selected subject. On the other hand, if a subject is already being tracked, the tracking unit 307 continues tracking the subject based on the position of the subject. The method for selecting the subject to be tracked may be any method by which one subject can be selected from a plurality of subjects detected from an image. For example, the tracking unit 307 selects the subject closest to the center of the image as the subject to be tracked.

The tracking unit 307 obtains the position of the subject in the image at the current time based on the position of the subject in the image at a time before the current time and the position of the subject detected by the detection unit 306. For example, the tracking unit 307 may also obtain a position obtained by associating a position predicted based on a movement history of the subject to be tracked and the detected position of the subject, as the position of the subject to be tracked. The tracking unit 307 outputs the subject tracking processing result to the orientation estimation unit 308 and the operation determination unit 312.

The orientation estimation unit 308 estimates the orientation of the subject based on the position (coordinates) of the subject received from tracking unit 307. The orientation estimation unit 308 can estimate the orientation of the subject with high accuracy using a subject orientation estimation technique based on Deep Learning. Also, there are orientation estimation techniques provided by OSS (Open Source Software) such as OpenPose and DeepPose. The present embodiment estimates the orientation of the subject using any technique for estimating the orientation of a subject by Deep Learning. The orientation estimation unit 308 extracts the position (coordinates) of the subject detected in the image, and uses an orientation estimation technique for the extracted position (coordinates) to estimate the orientation (joint points, etc.) of the subject. The orientation of the subject means connection information between the joint points (so-called human skeleton information) obtained based on the detected positions of the joint points of the subject (see FIG. 4). The orientation estimation unit 308 outputs the subject orientation estimation result to the motion determination unit 309.

The motion determination unit 309 analyzes the inclination of the specific part and the angle of the specific part in the orientation of the subject based on the result of the subject orientation estimation performed by the orientation estimation unit 308. The motion determination unit 309 determines whether or not the subject has performed a preliminary motion (hereinafter referred to as a preliminary motion) before moving rapidly, based on the subject orientation analysis result.

The motion determination unit 309 of the present embodiment determines the preliminary motion of the subject based on a rule base, but there is no limitation to this. For example, the motion determination unit 309 may also determine the preliminary motion of the subject using a learning model (deep learning) that is trained using a moving image obtained by recording the preliminary motion of the subject as training data. The preliminary motion includes, for example, an orientation in which the height from the ground to the center of gravity of the subject is lower than a threshold and an orientation in which an axis passing through the center of the subject is tilted with respect to the ground. However, there is no limitation to the above orientation as long as the orientation is one that the subject can assume before starting to move rapidly.

Figure 4:
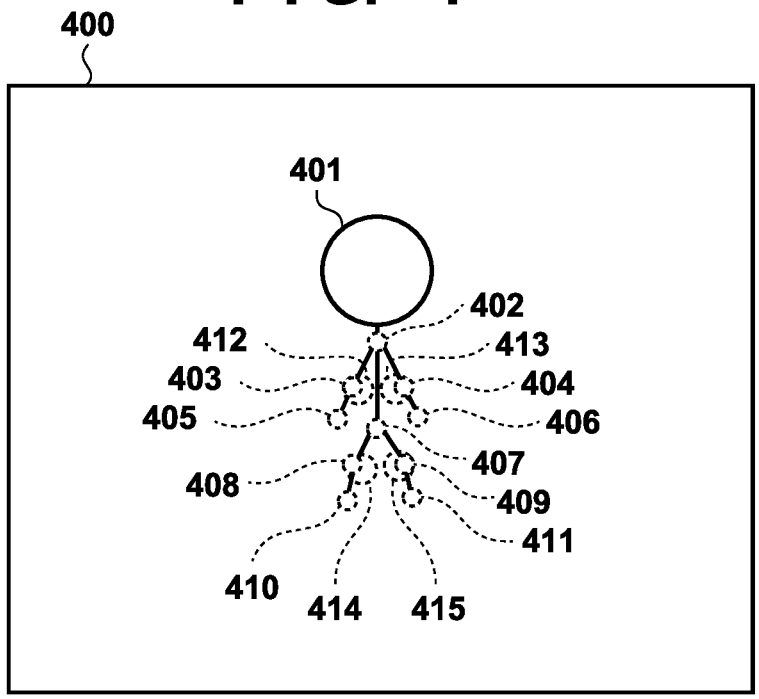
FIG. 4 is a diagram showing an example of a subject orientation estimation result.

Here, FIG. 4 is a diagram showing an example of the subject orientation estimation result.

A subject 401 is shown in the image 400. The subject 401 has a neck joint 402, a left elbow joint 403, a right elbow joint 404, a left wrist joint 405, a right wrist joint 406, a hip joint 407, a left knee joint 408, a right knee joint 409, a left ankle joint 410, and a right ankle joint 411. Note that "left" or "right" in front of each joint indicates the direction when the subject 401 is viewed from the front.

An angle 412 represents the angle of the left arm. The angle 412 is an angle between an axis connecting the neck joint 402 and the left elbow joint 403 and an axis connecting the left elbow joint 403 and the left wrist joint 405, and is 180° in FIG. 4. An angle 413 represents the angle of the right arm. The angle 413 is an angle between an axis connecting the neck joint 402 and the right elbow joint 404 and an axis connecting the right elbow joint 404 and the right wrist joint 406, and is 180° in FIG. 4.

An angle 414 represents the angle of the left leg. The angle 414 is an angle between an axis connecting the hip joint 407 and the left knee joint 408 and an axis connecting the left knee joint 408 and the left ankle joint 410, and is 180° in FIG. 4. An angle 415 represents the angle of the right leg. The angle 415 is an angle between an axis connecting the hip joint 407 and the right knee joint 409 and an axis connecting the right knee joint 409 and the right ankle joint 411, and is 180° in FIG. 4.

Figure 5:
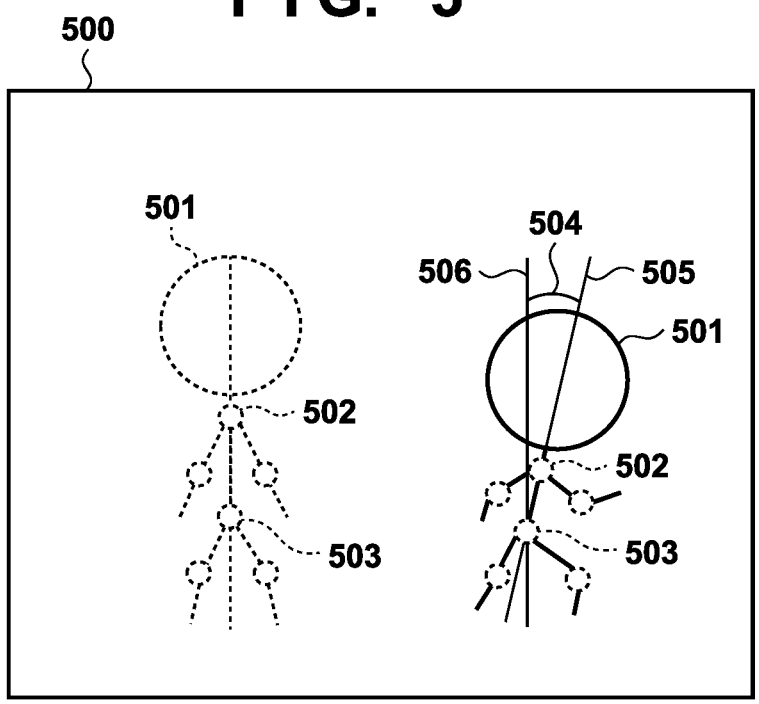
FIG. 5 is a diagram showing an example of a preliminary motion of a subject.
Figure 6:
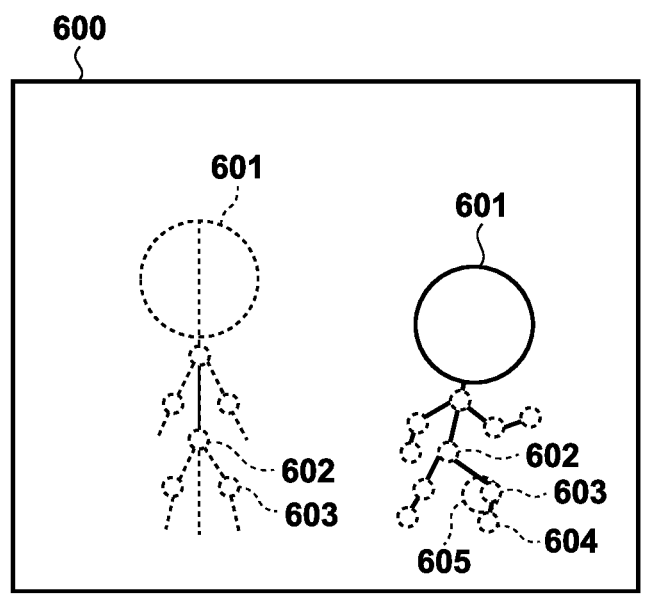
FIG. 6 is a diagram showing an example of a preliminary motion of a subject.

FIG. 5 is a diagram showing an example of the preliminary motion of the subject. FIG. 6 is a diagram showing an example of a preliminary motion of the subject.

The motion determination unit 309 determines that the subject is performing a preliminary motion when the subject is performing the motion (orientation) shown in the right diagram of FIG. 5 and the right diagram of FIG. 6. Note that the preliminary motions of the subject shown in FIGS. 5 and 6 are examples, and there is no limitation to these motions. The motion determination unit 309 may also determine whether or not the subject is performing a preliminary motion, for example, based on the angle of the left arm or right arm of the subject and the height from the ground to the center of gravity of the subject. The motion determination unit 309 of the present embodiment determines the preliminary motion of the subject based on a rule base, but there is no limitation to this. For example, the motion determination unit 309 may also determine the preliminary motion of the subject using a learning model (deep learning) that is trained using a moving image obtained by recording the preliminary motion of the subject as training data.

FIG. 5 will be described below. A subject 501 is shown in an image 500. The subject 501 has a neck joint 502 and a hip joint 503. The subject 501 shown on the left side of FIG. 5 is not performing a preliminary motion. On the other hand, the subject 501 shown on the right side of FIG. 5 is performing a preliminary motion.

An angle 504 represents the inclination of the motion (orientation) of the subject 501. The angle 504 is an angle between an axis 505 connecting the neck joint 502 and the waist joint 503 and an axis 506 extending vertically from the ground. The motion determination unit 309 determines that the subject 501 is performing a preliminary motion when the angle 504 is greater than or equal to the threshold. Here, the threshold is 30°, but there is no limitation to this. Note that on the left side of FIG. 5, the angle 504 does not exist (that is, the angle 504 is 0°), and therefore the motion determination unit 309 determines that the subject 501 is not performing a preliminary motion.

FIG. 6 will be described below. A subject 601 is shown in an image 600. The subject 601 includes a hip joint 602, a right knee joint 603, and a right ankle joint 604. An angle 605 represents the angle of the right leg. The angle 605 is an angle formed by an axis connecting the hip joint 602 and the right knee joint 603 and an axis connecting the right knee joint 603 and the right ankle joint 604, and is an angle of 180° or less, for example.

The motion determination unit 309 determines that the subject 601 is performing a preliminary motion when the angle 605 is within the threshold. Here, the threshold is 120°, but there is no limitation to this. Then, the motion determination unit 309 outputs the result of determining whether or not the subject is performing a preliminary motion to the region setting unit 310.

The description of FIG. 3 will be returned to. The region setting unit 310 sets the dead zone region in the image capture range of the image capture device 101 based on the tracking setting input by the user, and outputs the setting result to the recording unit 311. Note that the region setting unit 310 may set the tracking sensitivity in addition to setting the dead zone region. The dead zone region is a region in which the image capture control device 104 does not perform PTZ control of the image capture device 101 when the center position of the subject is in the dead zone region.

Figure 7:
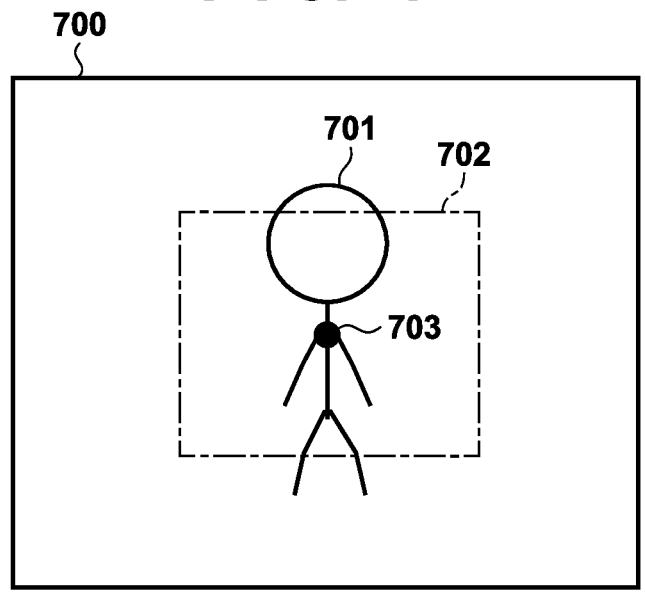
FIG. 7 is a diagram showing an example of a dead zone region.

FIG. 7 is a diagram showing an example of a dead zone region.

An image 700 includes a subject 701 and a dead zone region 702. The dead zone region 702 is a rectangular region represented by a dashed line. Here, when the subject 701 is in the dead zone region 702, the image capture control device 104 does not perform PTZ control of the image capture device 101.

The region setting unit 310 is region control unit, and sets a dead zone region when the determination result of the motion determination unit 309 indicates that the subject 701 is performing a preliminary motion. Note that the region setting section 310 may also change the pre-set dead zone region. Here, changing the dead zone region includes reducing the size of the dead zone region set in the image capture range and disabling the dead zone region (i.e., deleting the dead zone region).

Figure 8:
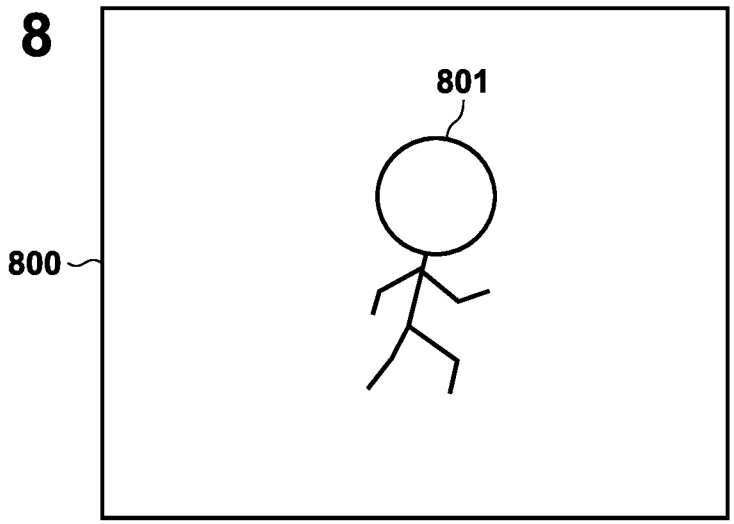
FIG. 8 is a diagram for illustrating an example of changing the dead zone region.
Figure 9:
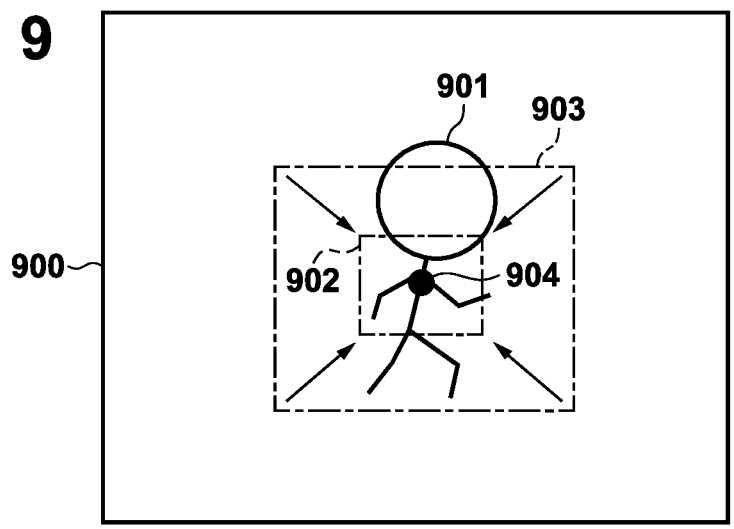
FIG. 9 is a diagram for illustrating an example of changing the dead zone region.

FIG. 8 is a diagram illustrating an example of changing the dead zone region. FIG. 9 is a diagram illustrating an example of changing the dead zone region.

A subject 801 is shown in an image 800. Since the subject 801 is performing a preliminary motion, the region setting unit 310 disables (that is, deletes) the dead zone region that the user previously set in the image 800, which is the image capture range. Accordingly, the image capture control device 104 performs PTZ control of the image capture device 101 to immediately respond to the start of movement of the subject 801, thereby preventing the subject 801 from being lost.

An image 900 includes a subject 901 and a dead zone region 902. The dead zone region 902 is smaller than a dead zone region 903 previously input by the user. Also, when changing the size of the dead zone region 903, the region setting unit 310 may change the size of the dead zone region 903 according to the position of the subject 901 in the image 900. The region setting unit 310 sets the dead zone region 903 input in advance by the user in the image 900 when the determination result of the motion determination unit 309 indicates that preliminary motion of the subject 901 has not occurred.

For example, the region setting unit 310 sets the dead zone region 702 input in advance by the user in the image 700 because the subject 701 in FIG. 7 is not performing a preliminary motion. Then, the region setting unit 310 outputs the setting of the dead zone region 702 to the operation determination unit 312.

The description of FIG. 3 will be returned to. The recording unit 311 records the result of setting the dead zone region received from the region setting unit 310. The recording unit 311 also outputs the setting of the recorded dead zone region to the region setting unit 310.

The operation determination unit 312 determines whether or not to control the PTZ of the image capture device 101 based on whether or not the position (e.g., two-dimensional coordinates) of the subject received from the tracking unit 307 is in the dead zone region received from the region setting unit 310.

For example, in FIG. 7, the operation determination unit 312 determines that the PTZ control of the image capture device 101 is not to be performed because the center position 703 of the subject 701 is in the dead zone region 702. Here, since the subject 701 is not performing a preliminary motion, the dead zone region 702 is set in the image 700. As a result, even if the subject 701 moves slightly due to staggering or the like, the image capture control device 104 does not need to perform unnecessary PTZ control on the image capture device 101.

In FIG. 8, the operation determination unit 312 determines that PTZ control of the image capture device 101 is to be performed because the dead zone region is not in the image 800. Here, since the subject 801 is performing a preliminary motion, there is a possibility that the subject 801 will move outside of the image 800 at a high speed. In view of this, the image capture control device 104 prevents the subject 801 from being lost by performing PTZ control of the image capture device 101 to immediately respond to the start of movement of the subject 801.

Furthermore, in FIG. 9, the operation determination unit 312 determines that PTZ control of the image capture device 101 is not to be performed because the center position 904 of the subject 901 is in the dead zone region 902. Here, since the subject 901 is performing a preliminary motion, a dead zone region 902 smaller than the dead zone region 903 is set in the image 900. As a result, the image capture control device 104 does not perform PTZ control immediately responding to the start of movement of the subject 901, but can perform PTZ control earlier than when the dead zone region 903 is set.

Figure 10:
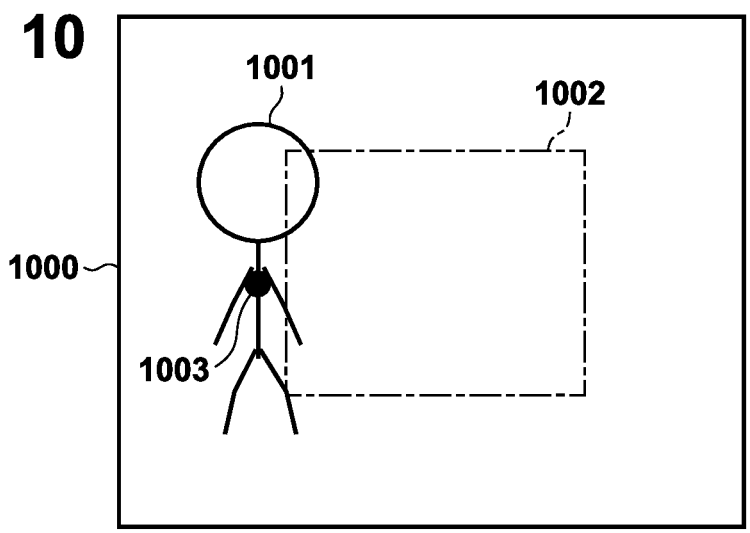
FIG. 10 is a diagram showing a subject outside the dead zone region.

FIG. 10 shows a diagram in which a subject appears outside the dead zone region.

Since a center position 1003 of the subject 1001 is outside the dead zone region 1002, the operation determination unit 312 determines that PTZ control of the image capture device 101 is to be performed. Then, the control unit 313 performs PTZ control of the image capture device 101 even if the subject 1001 is not performing a preliminary motion. The operation determination unit 312 outputs the determination result indicating whether or not to perform the PTZ operation of the image capture device 101 and the position (e.g., two-dimensional coordinates) of the subject to the control unit 313.

The description of FIG. 3 will be returned to. The control unit 313 calculates the PTZ control value of the image capture device 101 based on the determination result from the operation determination unit 312 and the position of the subject. For example, the control unit 313 calculates the PTZ control value such that the position of the subject in the image at the current time is located near the center of the image capture range of the image capture device 101, but there is no limitation to this. For example, the control unit 313 may also determine the PTZ control value through a method of directly specifying the PTZ control value and a method of specifying the directions and speeds of the pan and tilt. The control unit 313 outputs the PTZ control value to the driving device 103.

The output unit 314 outputs the video received from the acquisition unit 305 to the display device 115. The display device 115 displays the video received from the output unit 314 on the screen.

Figure 11:
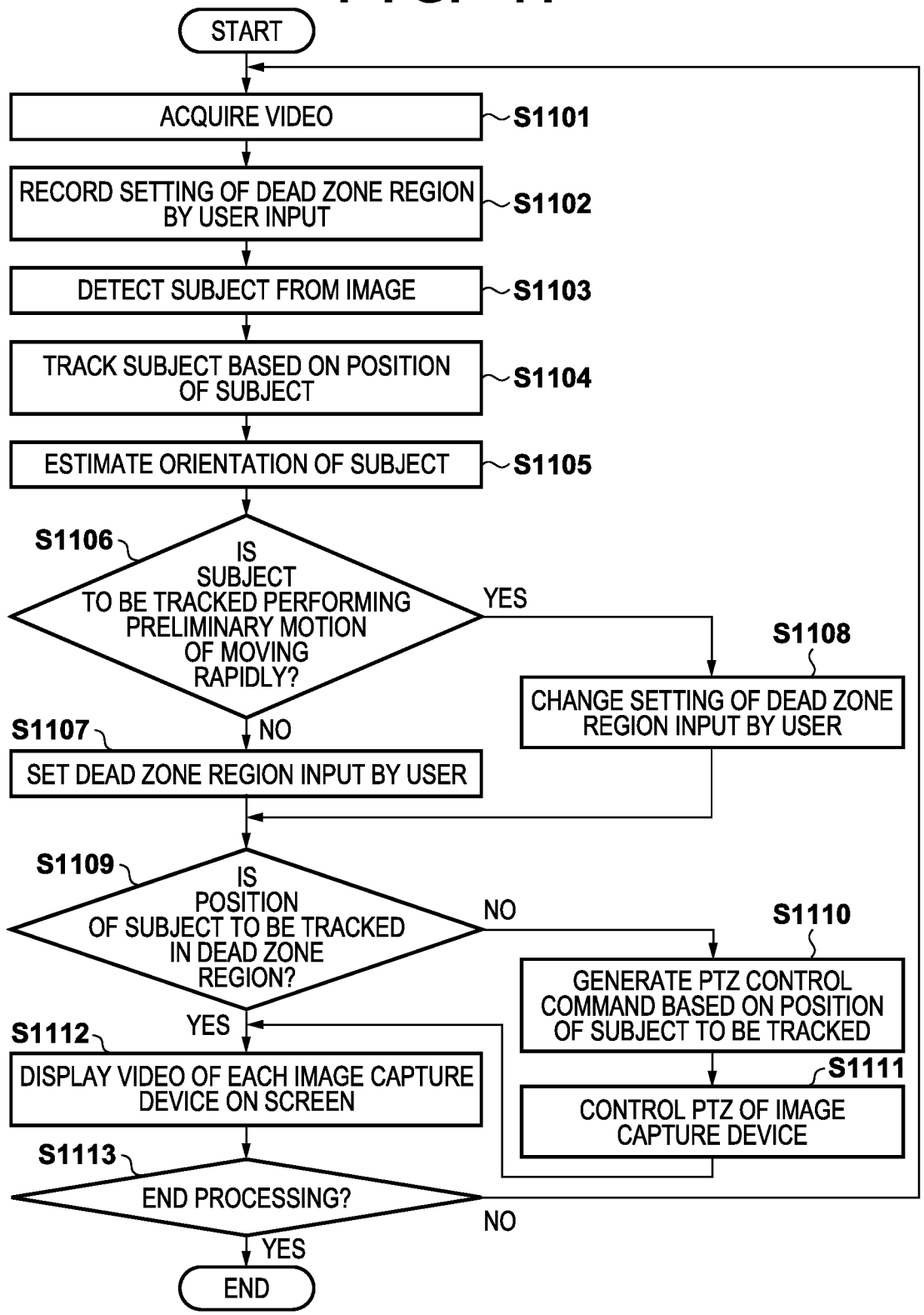
FIG. 11 is a flowchart showing processing of the image capture control device according to the first embodiment.

FIG. 11 is a flow chart showing processing of the image capture control device according to the first embodiment. The image capture system 10 starts image capture of a subject when activated by a user operation.

In step S1101, the acquisition unit 305 acquires the video from the image capture device 101 and outputs the acquired video to the detection unit 306 and the output unit 314.

In step S1102, the input device 102 receives the setting of the dead zone region from the user and outputs the setting of the dead zone region to the region setting unit 310. The region setting unit 310 outputs the setting of the dead zone region to the recording unit 311. The recording unit 311 records the setting of the dead zone region.

In step S1103, the detection unit 306 detects a subject from the image based on a known subject detection method. The detection unit 306 outputs the detected subject position and the image to the tracking unit 307.

In step S1104, the tracking unit 307 selects a subject to be tracked based on the position of the subject. The tracking unit 307 outputs the position (e.g., two-dimensional coordinates) and the image of the subject to be tracked to the orientation estimation unit 308 and the operation determination unit 312 as the tracking processing result.

In step S1105, the orientation estimation unit 308 estimates the orientation of the subject based on the positions (coordinates) of the joint points of the subject received from the tracking unit 307. Specifically, the orientation estimation unit 308 extracts the positions (coordinates) of the joint points of the subject detected from the image, and estimates the orientation of the subject using an orientation estimation technique on the extracted positions (coordinates) of the joint points. The orientation of the subject is connection information between joint points (so-called human skeleton information) obtained based on the positions of the joint points of the subject detected by the orientation estimation unit 308. The orientation estimation unit 308 outputs the subject orientation estimation result to the motion determination unit 309.

In step S1106, the motion determination unit 309 determines whether or not the subject is performing a preliminary motion of moving rapidly, based on the orientation of the subject to be tracked. When the motion determination unit 309 determines that the subject is performing a preliminary motion (Yes in step S1106), the processing proceeds to step S1108. When the motion determination unit 309 determines that the subject is not performing a preliminary motion (No in step S1106), the processing proceeds to step S1107.

In step S1107, the region setting unit 310 sets the dead zone region input by the user acquired from the recording unit 311 to the image capture range of the image capture device 101. That is, the region setting unit 310 performs control for maintaining the initial setting of the dead zone region.

In step S1108, if the dead zone region input by the user is set in the image capture range of the image capture device 101, the region setting unit 310 changes the setting of the dead zone region that has already been set.

In step S1109, the operation determination unit 312 determines whether or not the center position (e.g., two-dimensional coordinates) of the subject is in the dead zone region. When the operation determination unit 312 determines that the center position of the subject is in the dead zone region (Yes in step S1109), the processing proceeds to step S1112. When the operation determination unit 312 determines that the center position of the subject is not in the dead zone region (No in step S1109), the processing proceeds to step S1110.

In step S1010, the control unit 313 generates a PTZ control command based on the center position of the subject to be tracked. The control unit 313 outputs a PTZ control command to the driving device 103.

In step S1111, the driving device 103 drives the PTZ of the image capture device 101 to change the image capture direction and image capture range based on the PTZ control command.

In step S1112, the output unit 314 outputs the video captured by the image capture device 101 whose PTZ parameters have been changed, to the display device 115. When there are two or more image capture devices 101, the output unit 314 outputs videos corresponding to the number of the image capture devices 101 to the display device 115.

In step S1113, the CPU 200 determines whether or not an OFF switch (not shown) for stopping the operation of the image capture system 10 has been pressed. When the CPU 200 determines that the OFF switch (not shown) for stopping the operation of the image capture system 10 has not been pressed (No in step S1113), the processing returns to step S1101. When the CPU 200 determines that an OFF switch (not shown) for stopping the operation of the image capture system 10 has been pressed (YES in step S1113), the processing ends.

According to the first embodiment, when the dead zone region is set in the image capture range, the setting of the dead zone region is changed according to whether or not the subject is performing a preliminary motion. As a result, the PTZ control of the image capture device can be immediately performed in response to the start of movement of the subject, and the subject can be tracked without the subject being lost outside the image capture range.

Second Embodiment

In the second embodiment, the setting of the dead zone region and the "PTZ acceleration" are changed when the result of estimating the orientation of the subject indicates that the preliminary motion of the subject is occurring. As a result, the second embodiment can track the subject even when the subject to be tracked starts moving rapidly. In the second embodiment, differences from the first embodiment will be described.

Figure 12:
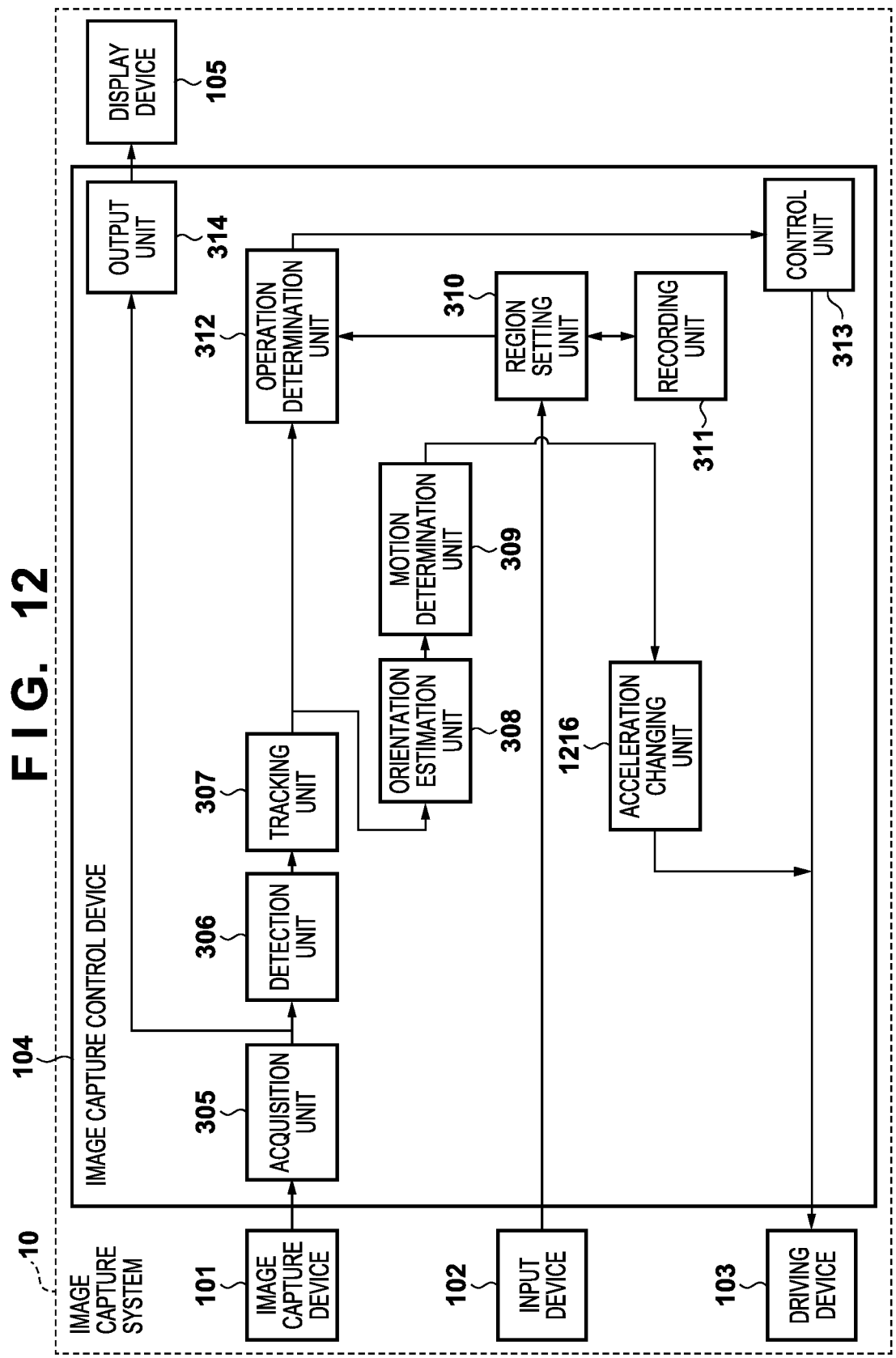
FIG. 12 is a block diagram showing a functional configuration of an image capture control device according to a second embodiment.

FIG. 12 is a block diagram showing a functional configuration of an image capture control device according to the second embodiment. Since blocks having the same functions as those of the first embodiment are denoted by the same reference numerals as those of the first embodiment, description of those blocks will be omitted.

The image capture control device 104 further includes an acceleration changing unit 1216 corresponding to an acceleration control unit. The driving device 103 drives the PTZ of the image capture device 101 based on the PTZ control value received from the control unit 313 and the PTZ acceleration from the acceleration changing unit 1216.

When the determination result of the motion determination unit 309 indicates that the subject is performing a preliminary motion, the acceleration changing unit 1216 changes the PTZ acceleration to a PTZ acceleration greater than the PTZ acceleration at the time of initial setting. The acceleration changing unit 1216 outputs the changed PTZ acceleration to the driving device 103. Note that the PTZ acceleration at the time of initial setting is the PTZ acceleration set in advance by the user, but there is no limitation to this. Also, the acceleration changing unit 1216 can change not only the PTZ acceleration but also the "PTZ velocity".

On the other hand, if the determination result of the motion determination unit 309 does not indicate that the subject is performing a preliminary motion, the acceleration changing unit 1216 changes the PTZ acceleration to the PTZ acceleration at the time of initial setting. The acceleration changing unit 1216 outputs the PTZ acceleration at the time of initial setting to the driving device 103.

Figure 13:
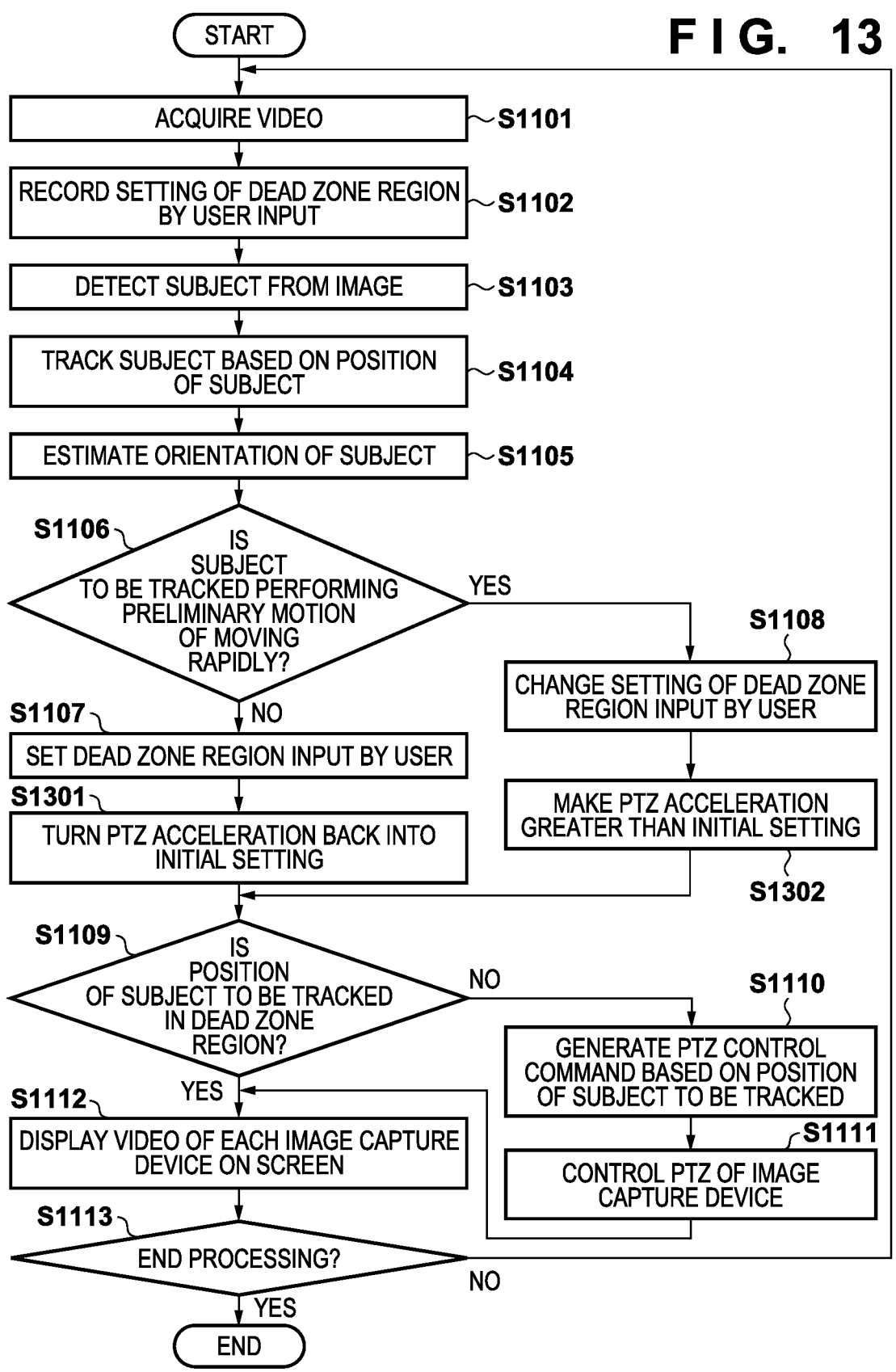
FIG. 13 is a flowchart showing processing of the image capture control device according to the second embodiment.

FIG. 13 is a flowchart showing processing of the image capture control device according to the second embodiment. In FIG. 13, differences from FIG. 11 will be described.

In step S1301, the acceleration changing unit 1216 changes the PTZ acceleration to the PTZ acceleration at the time of initial setting, and outputs the PTZ acceleration at the time of initial setting to the driving device 103.

In step S1302, the acceleration changing unit 1216 changes the PTZ acceleration to a PTZ acceleration greater than the PTZ acceleration at the time of initial setting, and outputs the changed PTZ acceleration to the driving device 103.

According to the second embodiment, when the dead zone region is set in the image capture range, the setting of the dead zone region and the PTZ acceleration are changed according to whether or not the subject is performing a preliminary motion. As a result, the PTZ control of the image capture device can be immediately performed in response to the start of movement of the subject, and the subject can be tracked without the subject being lost outside the image capture range.

Third Embodiment

As in the second embodiment, in the third embodiment, the setting of the dead zone region and the PTZ acceleration are changed when the orientation estimation result of the subject to be tracked indicates that the subject is performing a preliminary motion. Also, in the third embodiment, when the subject has stopped the preliminary motion continuously for a predetermined amount of time, the setting of the dead zone region and the setting of the PTZ acceleration are returned to the original settings. In the third embodiment, differences from the first embodiment and the second embodiment will be described.

Figure 14:
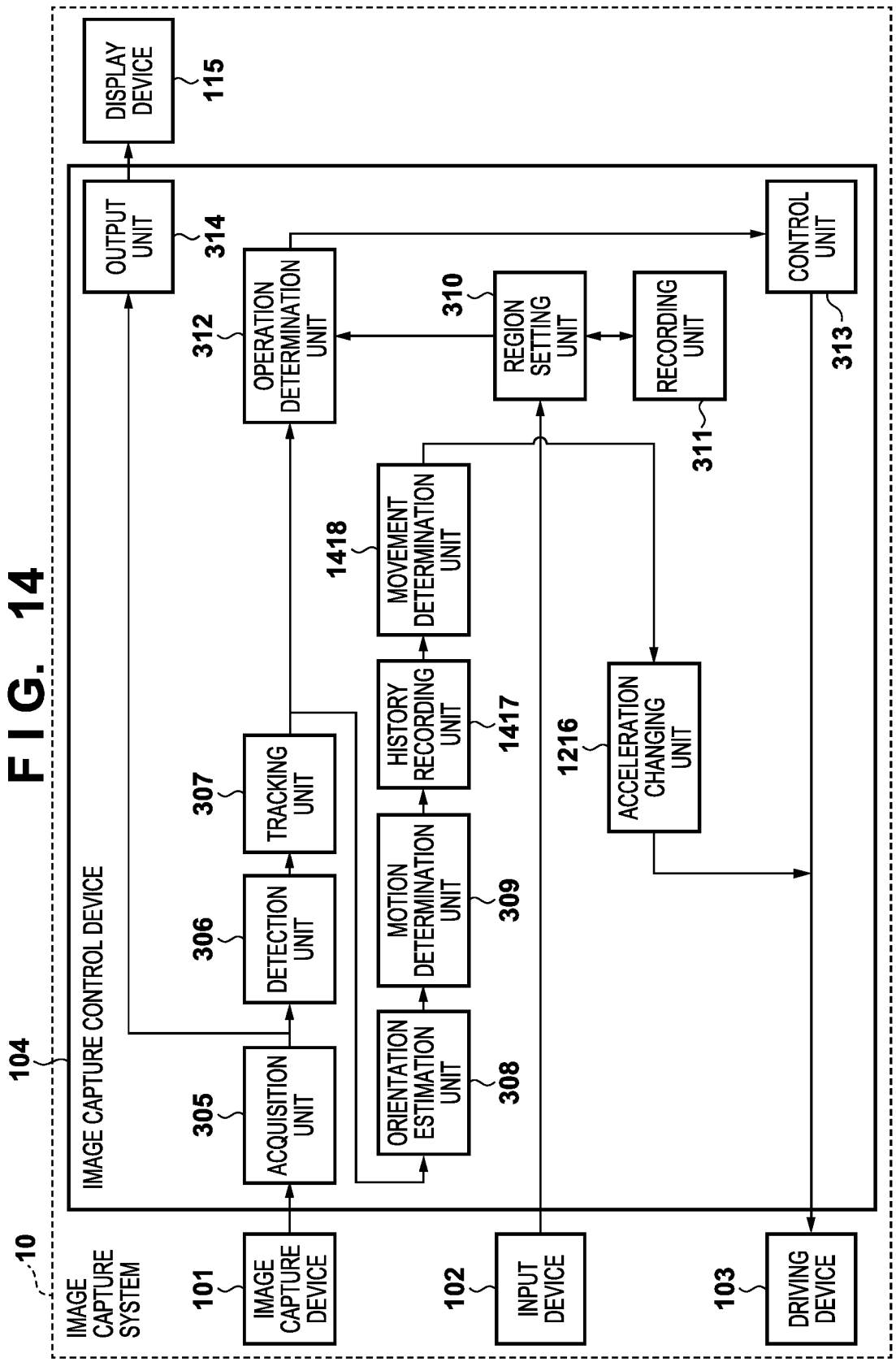
FIG. 14 is a block diagram showing a functional configuration of an image capture control device according to a third embodiment.

FIG. 14 is a block diagram showing a functional configuration of an image capture control device according to the third embodiment. Since blocks having the same functions as those of the first and second embodiments are denoted by the same reference numerals as those of the first and second embodiments, description of those blocks will be omitted.

The image capture control device 104 further includes a history recording unit 1417 and a movement determination unit 1418.

The history recording unit 1417 records the motion determination result of the motion determination unit 309 and the position of the subject. At this time, the history recording unit 1417 records the motion determination result and the position of the subject for at least several seconds. The history recording unit 1417 outputs the recorded result to the movement determination unit 1418.

The movement determination unit 1418 determines whether or not the subject, who is taking a preliminary motion (predetermined orientation) has actually moved within a predetermined amount of time, based on the result recorded by the history recording unit 1417. The predetermined amount of time may be an amount of time sufficient to determine whether or not the subject has moved, and is, for example, one second, but there is no limitation to this. Note that the movement determination unit 1418 determines that the subject has moved when the time for which the subject continues the preliminary motion is within the predetermined amount of time.

Figure 15:
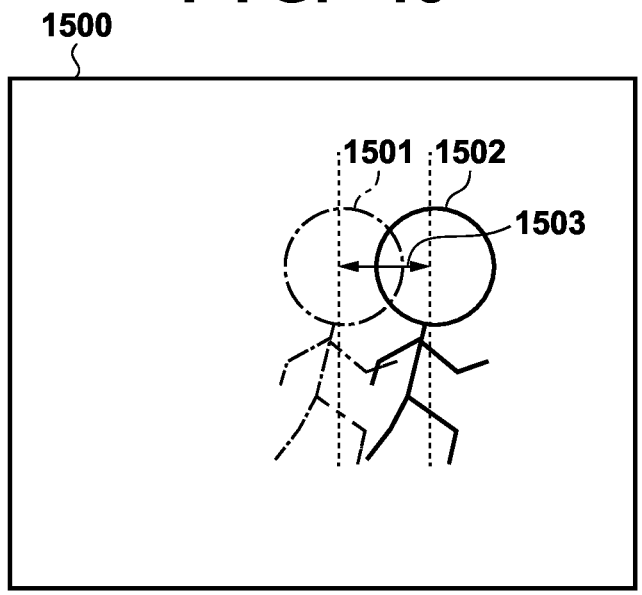
FIG. 15 is a diagram for illustrating a method for determining movement of a subject during a preliminary operation.

FIG. 15 is a diagram illustrating a method for determining movement of the subject during the preliminary motion.

An image 1500 includes a subject 1501, a subject 1502, and a moving distance 1503. The subject 1501 represents the subject one second before the current time, and the subject 1502 represents the subject at the current time. Also, the moving distance 1503 represents the distance (difference between the positions of the subject 1501 and the subject 1502) that the subject has moved within a predetermined amount of time. Here, the movement determination unit 1418 determines that the subject has moved when the moving distance 1503 is greater than a threshold. Note that the threshold may be any distance by which it is possible to determine that the subject has moved, and is, for example, 1 m, but there is no limitation to this. Although the predetermined amount of time is, but is not limited to, 1 second.

Figure 16:
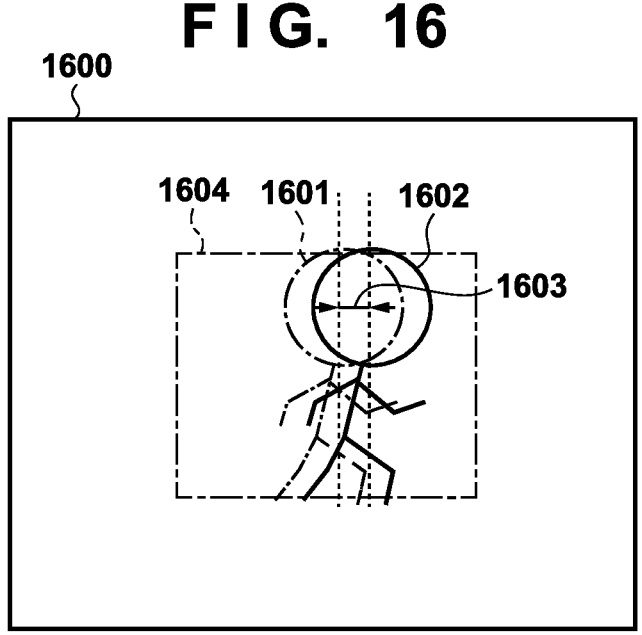
FIG. 16 is a diagram for illustrating a method for determining movement of a subject during a preliminary operation.

FIG. 16 is a diagram illustrating a method for determining movement of the subject during a preliminary motion.

An image 1600 includes a subject 1601, a subject 1602, a moving distance 1603, and a dead zone region 1604. The subject 1601 represents the subject one second before the current time, and the subject 1602 represents the subject at the current time. Also, the moving distance 1603 represents the distance that the subject has moved within a predetermined amount of time. Here, when the movement distance 1603 is smaller than a threshold, the movement determination unit 1418 determines that the subject has not moved. The predetermined distance is 1 m and the predetermined time is 1 second, but there is no limitation to this. The movement determination unit 1418 outputs the determination result regarding whether or not the subject has moved to the region setting unit 310 and the acceleration changing unit 1216.

The region setting unit 310 sets the setting of the dead zone region received from the input device 102 to the image capture range of the image capture device 101 and outputs the setting result to the recording unit 311. Also, when the determination result of the movement determination unit 1418 indicates that the subject has moved, the region setting unit 310 disables (deletes) the dead zone region as a setting change of the dead zone region performed by user input, as shown in FIG. 15. On the other hand, when the determination result of the movement determination unit 1418 does not indicate that the subject has moved, the region setting unit 310 sets a dead zone region based on user input, as shown in FIG. 16.

When the determination result of the movement determination unit 1418 indicates movement of the subject, the acceleration changing unit 1216 changes the PTZ acceleration to a PTZ acceleration greater than the PTZ acceleration at the time of initial setting, and outputs the changed PTZ acceleration to the driving device 103. On the other hand, if the determination result of the movement determination unit 1418 does not indicate that the subject has moved, the acceleration changing unit 1216 changes the PTZ acceleration to the PTZ acceleration at the time of initial setting, and outputs the PTZ acceleration at the time of initial setting to the driving device 103.

Figure 17A:
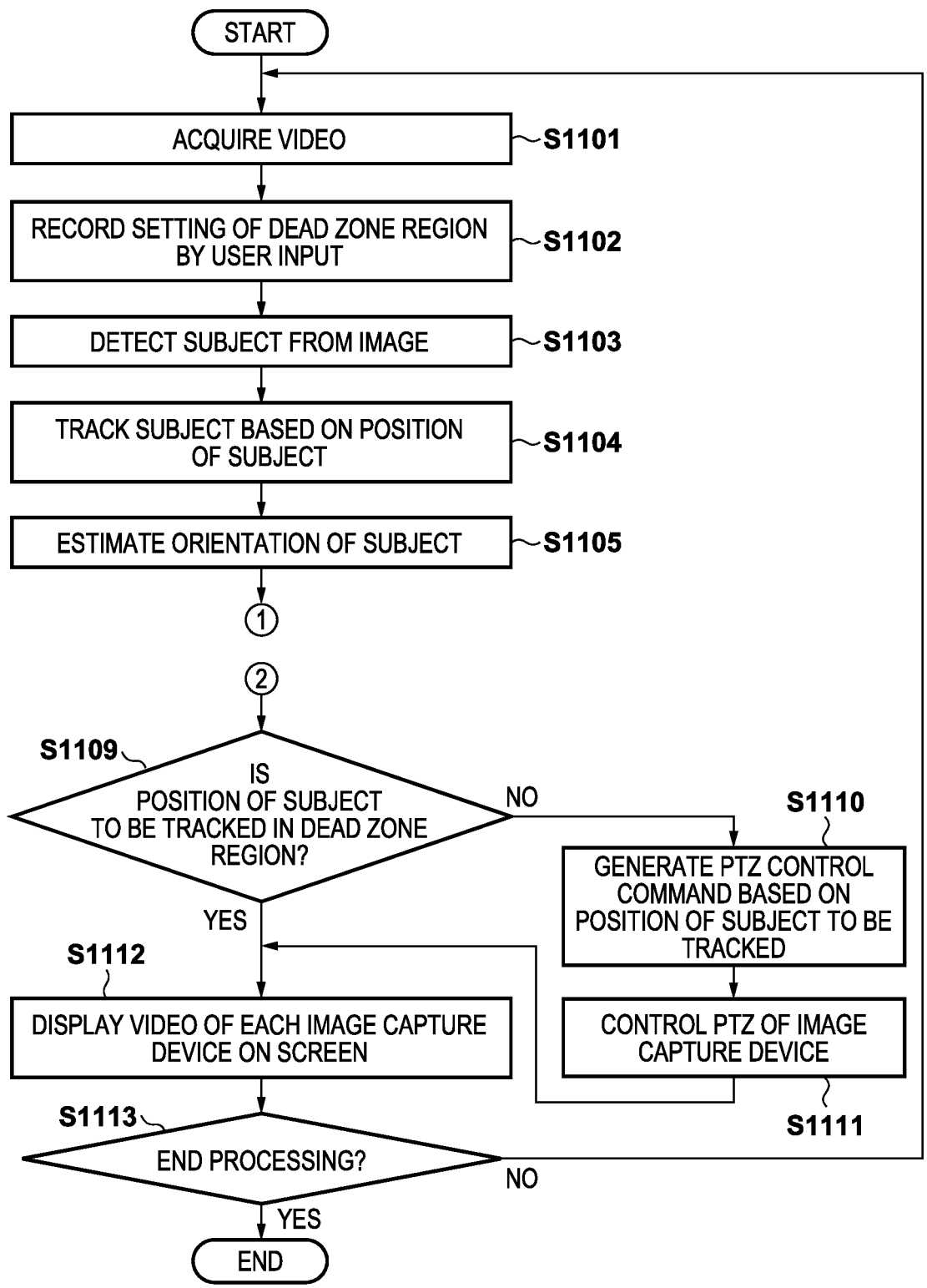
FIG. 17A is a flowchart showing processing of the image capture control device according to the third embodiment.
Figure 17B:
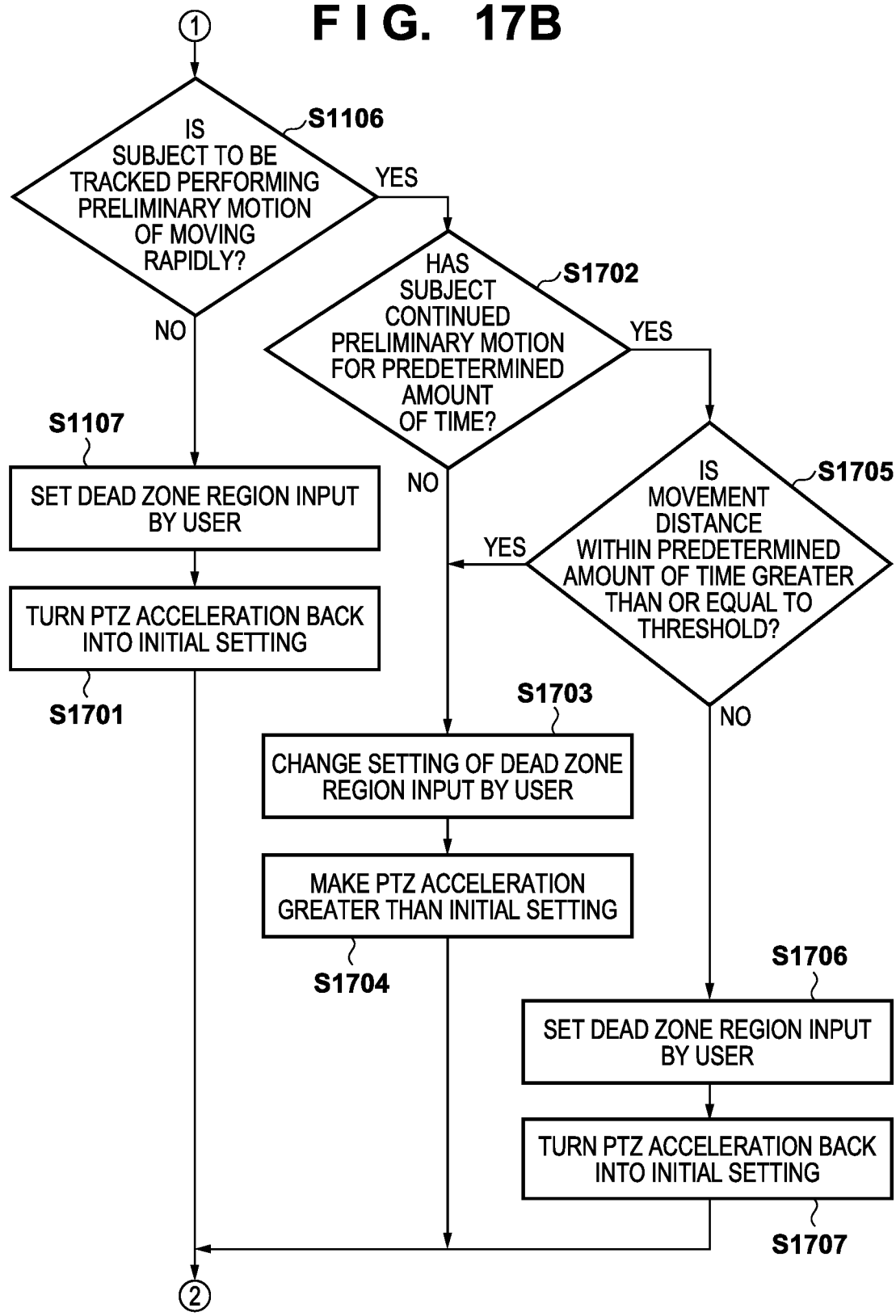
FIG. 17B is a flowchart showing processing of the image capture control device according to the third embodiment.

FIGS. 17A and 17B are a flow chart showing processing of the image capture control device according to the third embodiment. In FIGS. 17A and 17B, differences from FIG. 11 will be described.

In step S1701, the acceleration changing unit 1216 changes the PTZ acceleration to the PTZ acceleration at the time of initial setting, and outputs the changed PTZ acceleration at the time of initial setting to the driving device 103.

In step S1702, the movement determination unit 1418 determines whether or not the subject has continued the preliminary motion for a predetermined amount of time based on the motion determination result of the subject by the history recording unit 1417 and the position (coordinate) history information. If the movement determination unit 1418 determines that the subject has continued the preliminary motion for the predetermined amount of time (Yes in step S1702), the processing proceeds to step S1705. When the movement determination unit 1418 determines that the subject has not continued the preliminary motion for the predetermined amount of time (No in step S1702), the processing proceeds to step S1703.

In step S1703, the region setting unit 310 sets the dead zone region obtained by changing the dead zone region input by the user in the image capture range of the image capture device 101 when the dead zone region is set by the user input.

In step S1704, the acceleration changing unit 1216 changes the PTZ acceleration to a PTZ acceleration greater than the PTZ acceleration at the time of initial setting, and outputs the changed PTZ acceleration to the driving device 103.

In step S1705, the movement determination unit 1418 determines whether or not the movement distance of the subject within a predetermined amount of time is greater than or equal to a threshold, based on the motion determination result of the subject by the history recording unit 1417 and the history information of the position (coordinates) of the subject. When the movement determination unit 1418 determines that the movement distance of the subject within the predetermined time is greater than or equal to the threshold (Yes in step S1705), the processing proceeds to step S1703. When the movement determination unit 1418 determines that the movement distance of the subject within the predetermined amount of time is not greater than or equal to the threshold (No in step S1705), the processing proceeds to step S1706.

In step S1706, the region setting unit 310 sets the setting of the dead zone region by user input acquired from the recording unit 311 in the image capture range of the image capture device 101.

In step S1707, the acceleration changing unit 1216 changes the PTZ acceleration to the PTZ acceleration at the time of initial setting, and outputs the PTZ acceleration at the time of initial setting to the driving device 103.

According to the third embodiment, the setting of the dead zone region and the PTZ acceleration are changed based on the period of time during which the preliminary motion of the subject continues and the movement distance of the subject within the predetermined amount of time. This makes it possible to immediately track a subject that performs a preliminary motion and is actually moving. In addition, unnecessary PTZ control can be suppressed by setting a dead zone region when tracking a subject that stops or moves slightly while continuing the preliminary motion (that is, performs a feint motion).

Modified Example

In a modified example of the third embodiment, the movement direction of the subject is estimated based on the movement history of the subject, and if it is determined that the subject has performed a preliminary motion, the image capture direction is controlled in the same direction as the movement direction of the subject.

Figure 18A:
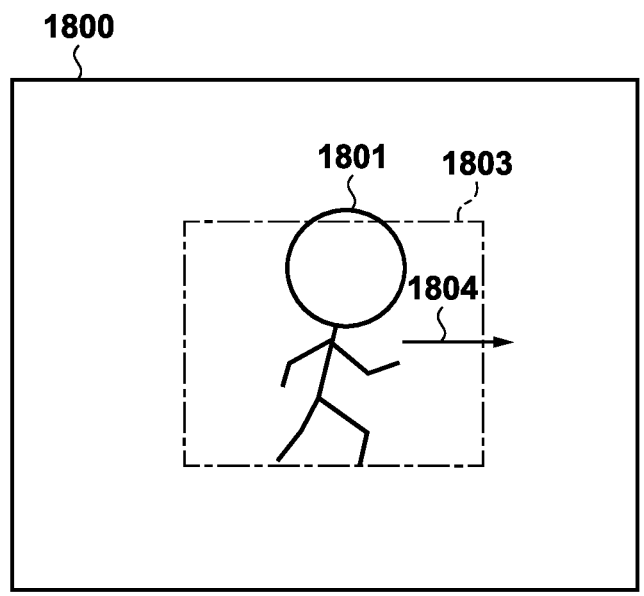
FIG. 18A is a diagram for illustrating image capture control performed by the image capture device after a preliminary motion of the subject.
Figure 18B:
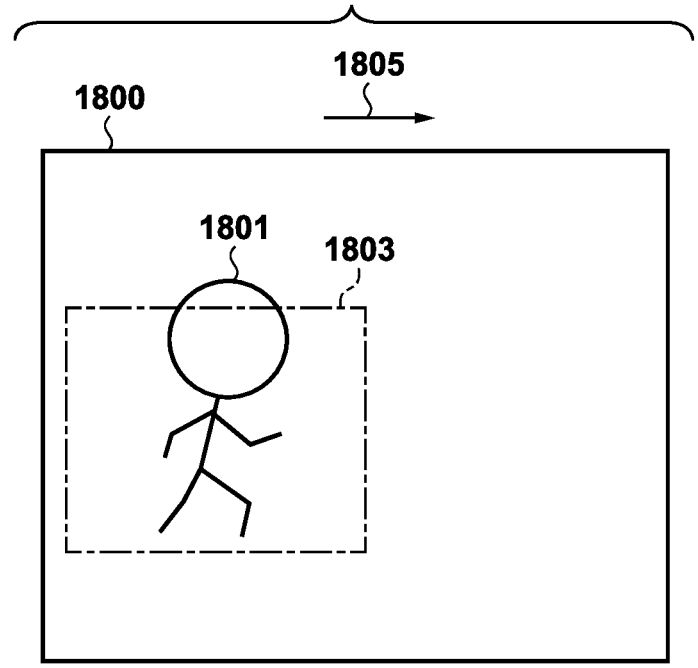
FIG. 18B is a diagram for illustrating image capture control performed by the image capture device after a preliminary motion of the subject.

FIGS. 18A and 18B are diagrams for illustrating image capture control performed by the image capture device after the preliminary motion of the subject. FIG. 18A shows a diagram in which the movement direction of the subject is estimated when the subject performs a preliminary motion. FIG. 18B shows a diagram in which image capture control is performed so as to correspond to the movement direction of the subject.

In FIG. 18A, an image 1800 includes a subject 1801, a dead zone region 1803, and a movement direction 1804. The movement direction 1804 represents the movement direction of the subject 1801 estimated by the movement determination unit 1418 based on the movement history of the subject. In FIG. 18B, the image 1800 shows the subject 1801 and the dead zone region 1803. A panning direction 1805 is a direction in which panning of the image capture device 101 is changed. Based on the estimation result (movement direction 1804) of the movement determination unit 1418, the operation determination unit 312 determines that the image capture device 101 is to be controlled in the panning direction 1805 with a predetermined pan value. The predetermined pan value is a value according to which a space can be formed between the subject 1801 in the image of FIG. 18B and the right edge of the image. This space is provided to ensure extra time for the image capture control device 104 to capture an image of the subject 1801. The larger the space is, the longer the extra time to track the subject 1801 is. This makes it possible for the image capture control device 104 to capture an image of (track) the subject 1801 without losing the subject 1801.

Also, the motion determination unit 309 may weight each of a plurality of candidates for a preliminary motion (orientation) performed by the subject, and determine whether or not the subject has performed the preliminary motion based on whether or not the weighted score of the determined motion exceeds a threshold. Preliminary motion candidates include, for example, an orientation in which the height from the ground to the center of gravity of the upright subject is low, an orientation in which the angle 504 in FIG. 5 is formed, and an orientation in which the angle 605 in FIG. 6 is formed.

Furthermore, the orientation estimation unit 308 may estimate, for example, the face direction and the line-of-sight direction of the subject, in addition to the elbow joint, knee joint, waist joint, ankle joint, wrist joint, and the like, as the orientation information of the subject. The motion determination unit 309 may also determine whether or not the subject has performed a preliminary motion based on whether or not the face direction or the line-of-sight direction of the subject is directed outside the dead zone region.

Figure 19A:
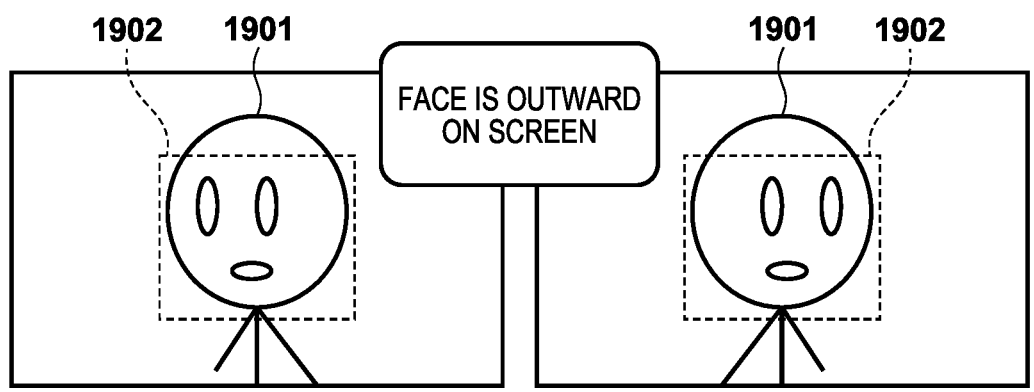
FIG. 19A is a diagram for determining a preliminary motion based on information other than joints of the subject.
Figure 19B:
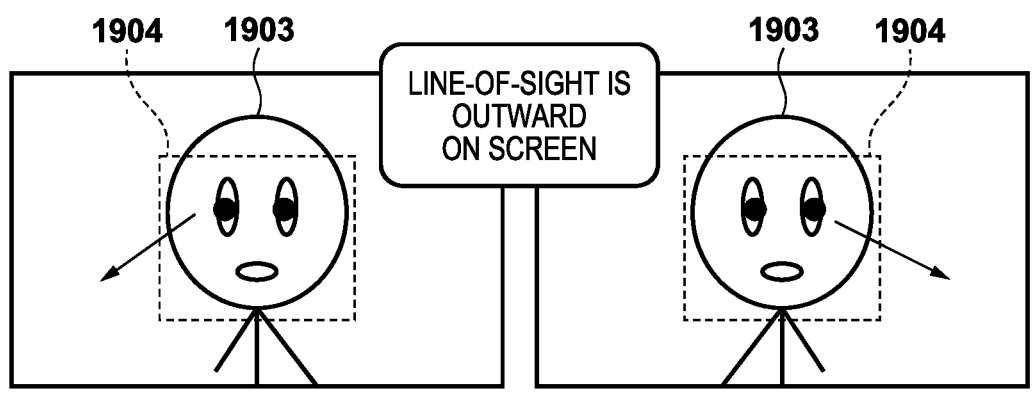
FIG. 19B is a diagram for determining a preliminary motion based on information other than joints of the subject.

FIGS. 19A and 19B are diagrams for determining a preliminary motion based on information other than joints of the subject. FIG. 19A is a diagram for determining a preliminary motion based on the direction in which the subject is facing. FIG. 19B is a diagram for determining a preliminary motion based on the line-of-sight direction of the subject.

In the left diagram of FIG. 19A, the orientation estimation unit 308 estimates the face direction of the subject 1901 based on the positions (coordinates) of facial features of the subject 1901. The facial features are the positions of the left eye, right eye, and mouth. The motion determination unit 309 determines that the subject 1901 is performing a preliminary motion when the face direction of the subject 1901 is directed toward the left side of the dead zone region 1902. Note that the right diagram of FIG. 19A shows a case where the face direction of the subject 1901 is directed toward the right side of the dead zone region 1902, but the motion determination unit 309 can determine the preliminary motion of the subject 1901 using the same method as described above.

In the left diagram of FIG. 19B, the orientation estimation unit 308 estimates the line-of-sight direction of a subject 1903 based on the positions (coordinates) of facial features of the subject 1903. The facial features are the positions of the left and right eyes. The motion determination unit 309 determines that the subject 1903 has performed a preliminary motion when the line-of-sight direction of the subject 1903 points to the left side of a dead zone region 1904. Note that although the right diagram of FIG. 19B shows the case where the line-of-sight direction of the subject 1903 points to the right side of the dead zone region 1904, the motion determination unit 309 can determine the preliminary motion of the subject 1903 using the same method as described above.

Fourth Embodiment

In the first to third embodiments, the method of using the center position of the subject in determining whether or not the subject is within the dead zone region was described. In the fourth embodiment, a method of using the "center of gravity" calculated based on the joint position information of the subject as the center position of the subject will be described.

In the determination processing in step S1109, it is determined whether or not the center position of the subject is in the dead zone region. When the center position of the subject is at the center of a rectangular frame (hereinafter referred to as a bounding box) surrounding the subject, the center position of the subject moves due to the subject's hand and/or foot parts moving. Therefore, it is necessary to increase the size of the dead zone region with consideration given also to the amount of change in the center position of the subject. By setting the center position of the subject to the center of gravity of the body part of the subject (excluding the parts of the hands and feet), it is possible to reduce the change in the center position due to the movement of the hands and/or feet of the subject. Therefore, it is possible to make the dead zone region smaller than before.

Figure 20:
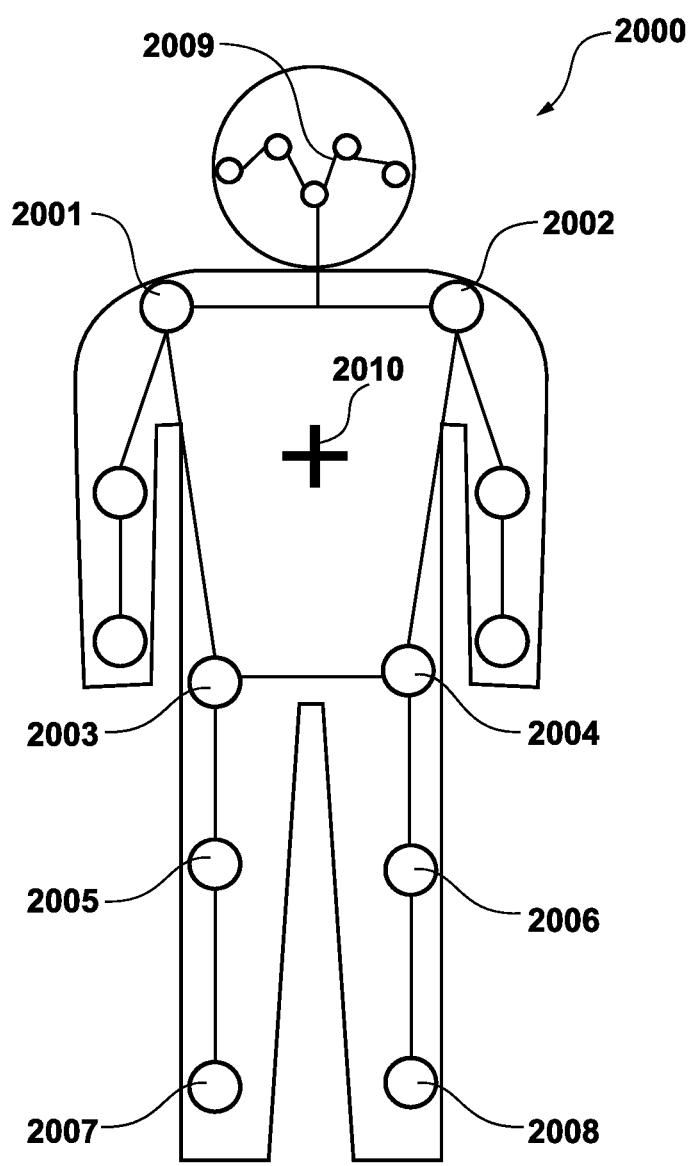
FIG. 20 is a diagram for illustrating an example of a method for calculating the center of gravity of a subject.

FIG. 20 is a diagram illustrating an example of a method of calculating the center of gravity of a subject.

An image 2000 shows an example of joint points of a human body (subject) estimated by the orientation estimation unit 308, and shows an example of joint points of a subject different from those in FIG. 4. The image 2000 shows a right shoulder 2001, a left shoulder 2002, a right hip 2003, a left hip 2004, a right knee 2005, a left knee 2006, a right heel 2007, a left heel 2008, and a nose 2009 as joint points of the subject. A center of gravity 2010 is the center of gravity of the subject, and is illustrated with a "plus", for example. Note that "left" and "right" in the image 2000 represent "left" and "right" as viewed from the subject.

In this embodiment, the orientation estimation unit 308 calculates the center of gravity 2010 of the subject based on the position information of the joint points on the torso of the subject excluding the hands, feet (legs), and head. Specifically, the orientation estimation unit 308 calculates the center of gravity 2010 of the subject based on the coordinates of four points, namely the right shoulder 2001, the left shoulder 2002, the right hip 2003, and the left hip 2004. Note that in this embodiment, the orientation estimation unit 308 uses the position information of the shoulders and hips, excluding the position information of the hands, feet, and head, is used to calculate the center of gravity 2010 of the subject.

However, in line with the purpose of appropriately determining the start of movement of the subject, the parts (joint points) of the subject used for calculating the center of gravity 2010 of the subject may also be combined with other parts. For example, when the subject performs an upper roundhouse kick (high kick) in which the leg is moved significantly on the spot as a martial art (for example, karate) motion, the orientation estimation unit 308 does not use the position information of the feet of the subject to calculate the center of gravity 2010 of the subject. On the other hand, the orientation estimation unit 308 may use the position information of the feet of the subject to calculate the center of gravity 2010 of the subject who is playing a sport in which the center of gravity 2010 of the subject does not change significantly.

Also, the orientation estimation unit 308 may output a reliability estimated for each part (joint point) of the subject, and may change the parts (joint points) used to calculate the center of gravity 2010 of the subject according to the output reliability level of each part of the subject. For example, when the certainty (i.e., reliability) of the position information estimated for the right hip 2003 and the left hip 2004 of the subject is lower than a threshold, the orientation estimation unit 308 may calculate the center of gravity 2010 of the subject using only the position information for the right shoulder 2001 and the left shoulder 2002 of the subject.

Figure 21A:
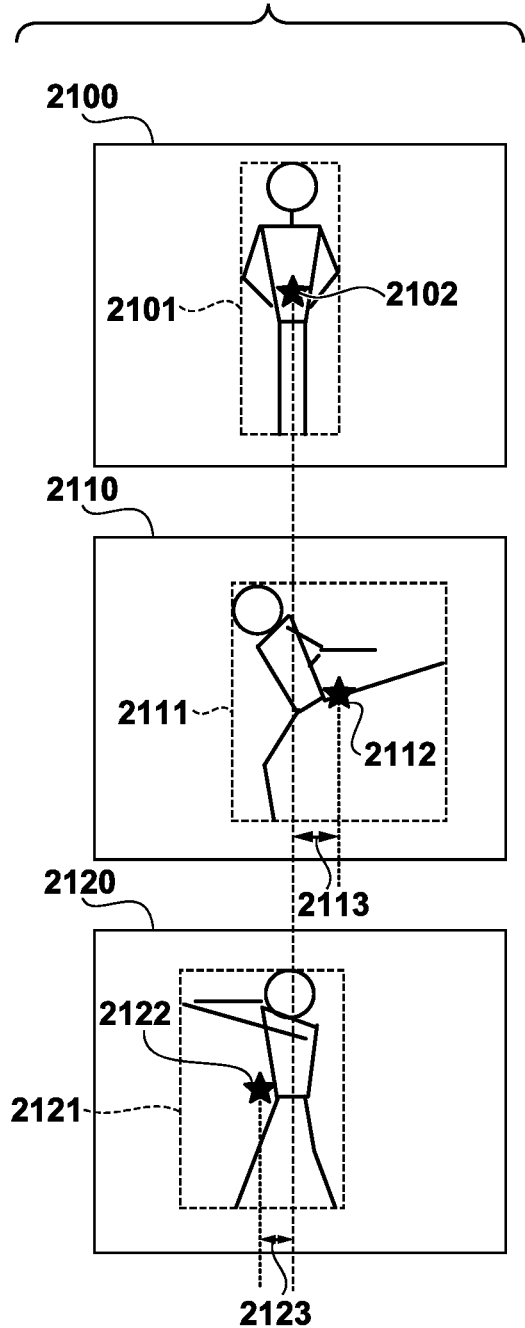
FIG. 21A is an example in which the center of a bounding box is a center position of the subject.
Figure 21B:
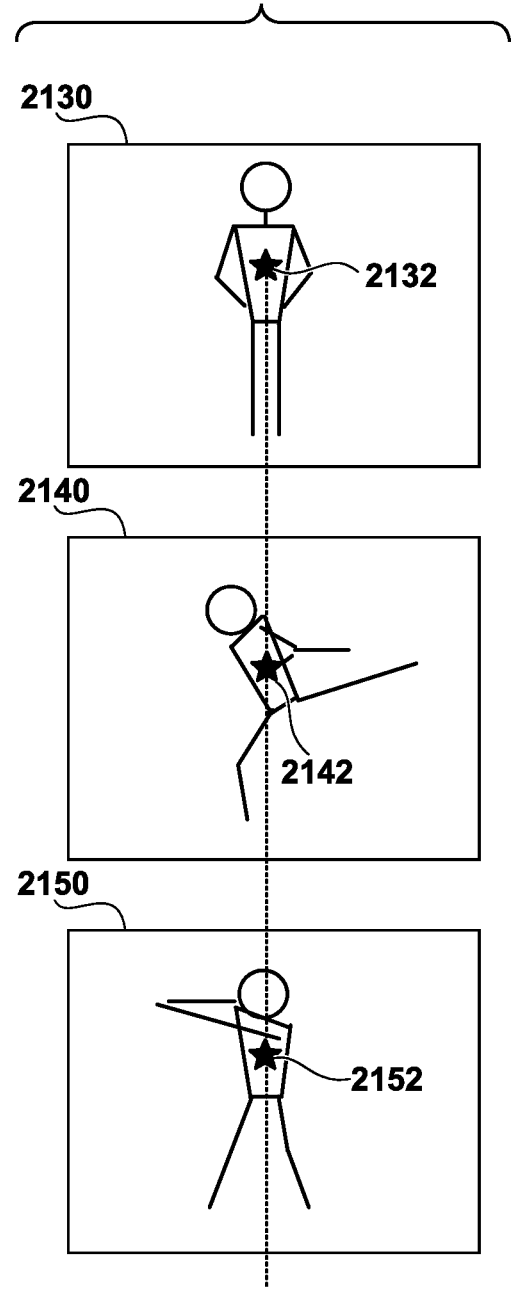
FIG. 21B is an example in which the center of gravity of the subject is determined based on position information of parts (joint points) of the subject.

FIGS. 21A and 21B are diagrams for illustrating respective changes in the conventional center position of the subject and the center position of the subject of the present invention according to the motion of the subject.

FIG. 21A shows an example where the center of the bounding box is the center position of the subject. An image 2100 shows a state in which the subject is stationary. In the image 2100, the upright subject is surrounded by a bounding box 2101. A center 2102 is the center of the bounding box 2101 and is illustrated with a star mark. Images 2110 and 2120 show states in which the subjects do not move but move their hands and feet significantly at a predetermined position. In the image 2110, the subject is performing an upper roundhouse kick (high kick), for example. In the image 2120, the subject is performing a golf backswing motion. The subjects of the images 2110 and 2120 are surrounded by bounding boxes 2111 and 2121, respectively. A center 2112 is the center of the bounding box 2111 and is illustrated with a star mark. A center 2122 is the center of the bounding box 2121 and is illustrated with a star mark.

A position change amount 2113 is a position change amount between the center of gravity 2102 and the center of gravity 2112. A position change amount 2123 is a position change amount between the center of gravity 2102 and the center of gravity 2122. As indicated by the position change amount 2113 and the position change amount 2123, when the center of the bounding box is the center position of the subject, the position of the center of gravity changes significantly depending on the movement of the subject's hands and feet. The motion determination unit 309 may erroneously detect the start of movement of the subject based on the position change amount 2113 or the position change amount 2123.

FIG. 21B is an example in which the center of gravity obtained based on the position information of the parts (joint points) of the subject is set as the center position of the subject.

An image 2130, an image 2140, and an image 2150 correspond to the image 2100, the image 2110, and the image 2120, respectively, and therefore detailed description thereof will be omitted. However, the center of gravity 2132 to the center of gravity 2152 of the subject of the images 2130 to 2150 are different from the center of gravity 2102 to the center of gravity 2122 of the subject of the images 2100 to 2120. The center of gravity 2132, the center of gravity 2142, and the center of gravity 2152 are the centers of gravity calculated based on the position information of the subject's left and right shoulders and hips, and correspond to the center of gravity 2010 in FIG. 20. As shown in FIG. 21B, the positions of the center of gravity 2132, the center of gravity 2142, and the center of gravity 2152 are generally at the same position, and for example, the respective position change amounts of the center of gravity 2142 and the center of gravity 2152 with respect to the center of gravity 2132 when using the center of gravity 2132 as a reference are very small. Since the orientation estimation unit 308 calculates the center of gravity of the subject based on the position information of the shoulders and hips of the human body (subject), the calculated center of gravity is not significantly affected by the movement of the hands and feet of the subject. Then, the motion determination unit 309 can determine whether or not the subject has started to move based on whether or not the calculated position of the center of gravity of the subject is present in the dead zone region set in the image capture range. For example, when the calculated position of the center of gravity of the subject is in the dead zone region set in the image capture range, the motion determination unit 309 determines that the subject has not started moving. On the other hand, when the calculated position of the center of gravity of the subject is not in the dead zone region set in the image capture range, the motion determination unit 309 determines that the subject has started moving. Also, the motion determination unit 309 may determine whether or not the subject has started moving based on whether or not the lateral movement amount in the image capture range of the calculated position of the center of gravity of the subject is greater than or equal to a threshold. Note that the lateral movement amount does not include the amount of movement caused by changing the image capture direction of the image capture device. As a result, the motion determination unit 309 can appropriately determine that the subject has not started moving, and can reduce erroneous detection of the start of movement of the subject.

Note that this embodiment described a case in which control of the dead zone region is performed by comparing the dead zone region on the captured video with the position of the subject on the captured video while the camera is imaging the subject in a stationary state without performing PTZ control. On the other hand, while the user is manually operating the PTZ of the camera using a controller (not shown), the camera may detect the start of movement of the subject and the dead zone region may be controlled such that the subject can be automatically tracked. In the control of the dead zone region in this case, the position of the subject on the captured video changes due to the user's PTZ control, and therefore the motion determination unit 309 needs to determine whether or not the subject has started moving based on the position of the subject in a real space. Here, the position of the subject in the real space is a position obtained by converting the calculated position of the center of gravity of the subject based on a known coordinate conversion method. For example, the motion determination unit 309 determines that the subject is outside the dead zone region when the position of the subject in the real space has moved by a predetermined value or more. Note that the method for determining whether or not the subject is outside the dead zone region in the real space is not limited to the above. As an example, when a virtual spherical surface centered on the camera is assumed, the direction of the lens optical axis, the direction of the subject position, and the dead zone region can be expressed in polar coordinates on the spherical surface. The motion determination unit 309 can determine whether the subject position on the polar coordinates is inside or outside the dead zone region. Note that in this embodiment, although the description was premised on the dead zone region being set in the image capture range, it is also possible to use a configuration in which the dead zone region is not provided, and PTZ control is performed immediately based on movement of the subject center position (i.e., the position of the center of gravity of the subject).

As described above, the orientation estimation unit 308 can calculate the center of gravity of the subject based on the position information of the torso excluding the hands, feet, and head of the subject. Also, if the calculated center of gravity is set as the center position of the subject, the motion determination unit 309 can determine, with high accuracy, the start of movement of the subject without being influenced by changes in the position of the center of gravity caused by movement of the hands and feet of the subject. As a result, it is possible to make the dead zone region on the video (image capture range) smaller than before, and to immediately perform PTZ control in response to the start of movement of the subject. This makes it possible to continue shooting the subject such that the subject remains within the image capture range.

Fifth Embodiment

In the first to third embodiments, the method of using the preliminary motion of the subject in the determination of changing the dead zone region (reducing the size of or disabling the dead zone region) has been described. In the fifth embodiment, an example will be described in which the dead zone region is changed (specifically, disabled) and PTZ control is immediately performed by the control unit 313 when it is detected that the subject has started moving. A method of detecting switching of the positions of the left and right feet of the subject to detect the start of movement of the subject will be described.

Figure 22:
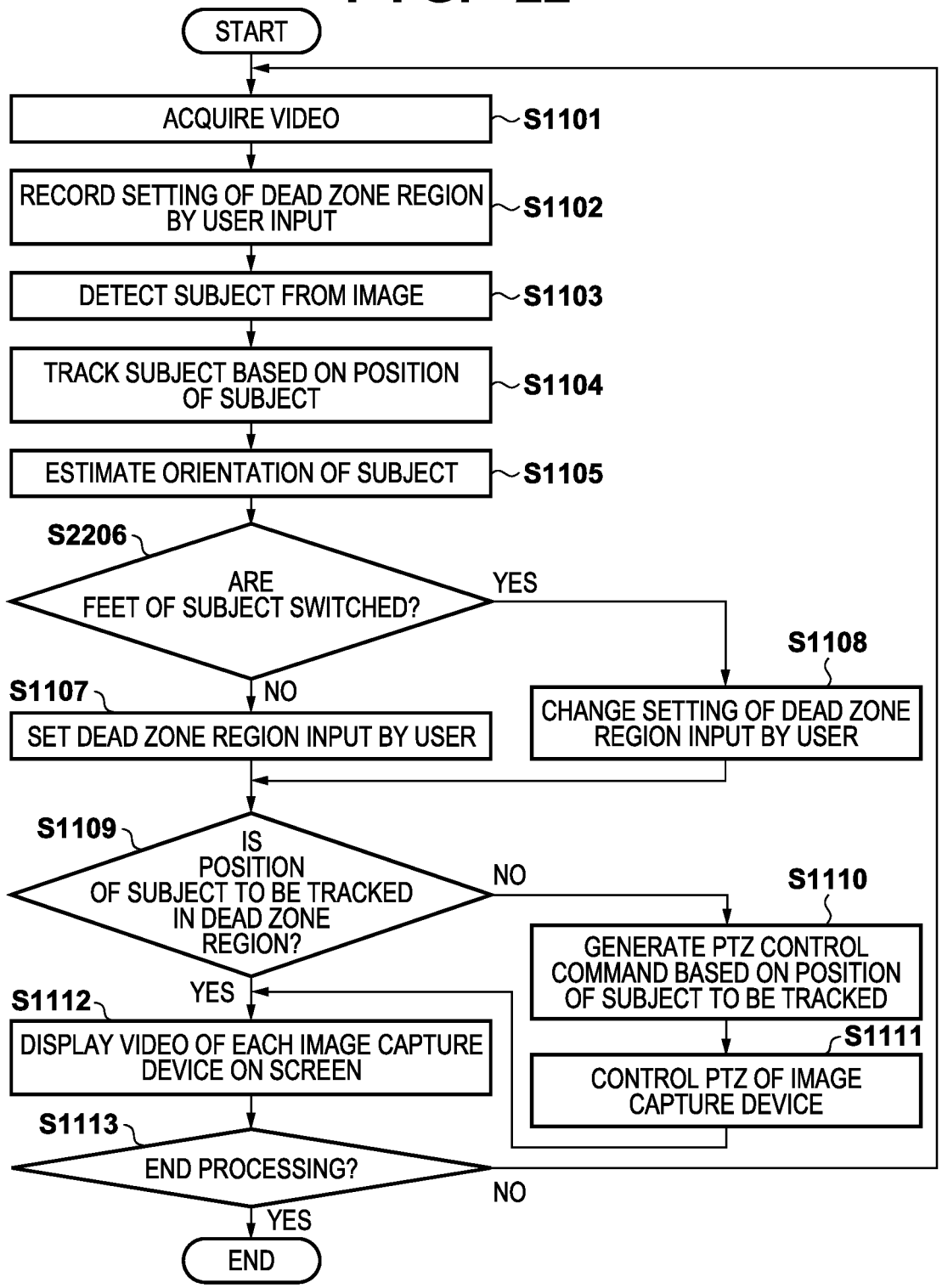
FIG. 22 is a flowchart for illustrating processing of an automatic shooting system according to a fifth embodiment.

FIG. 22 is a flow chart illustrating processing of an automatic shooting system according to the fifth embodiment. Note that the processing of steps S1101 to S1105 and steps S1107 to S1113 are the same as those of the first embodiment, and therefore description thereof will be omitted.

In step S2206, the motion determination unit 309 determines whether or not the left and right feet of the subject have been switched based on the input orientation information of the subject. If the motion determination unit 309 determines that the positions of the left and right feet of the subject have not been switched (No in step S2206), the processing proceeds to step S1107. If the motion determination unit 309 determines that the positions of the left and right feet of the subject have been switched (Yes in step S2206), the processing proceeds to step S1108. Note that a method for determining the switching of the positions of the left and right feet of the subject will be described later.

In step S1108, the region setting unit 310 disables the setting of the dead zone region even when the dead zone region input by the user is set in the video (image). Accordingly, in step S1109, the motion determination unit 309 determines that the subject is not in the dead zone region, and the control unit 313 immediately performs PTZ control according to the movement of the subject.

In step S1107, the region setting unit 310 sets the dead zone region input by the user as the image capture range.

Note that the orientation information input to the motion determination unit 309 in step S2206 is the position information of the right heel 2007 and left heel 2008 of the subject. The motion determination unit 309 compares the input orientation information with the previous state (position information of the joint points of the subject recorded in the recording unit 311), and determines whether or not the positions of the left and right feet of the subject have been switched. Note that is assumed that the motion determination unit 309 obtains information about the previous state by referring to information recorded in the recording unit 311.

Figure 23:
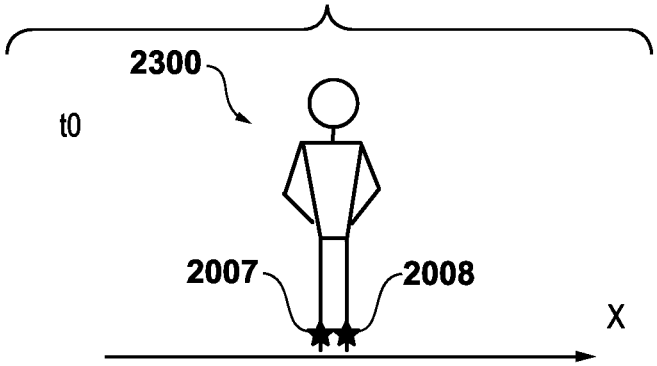
FIG. 23 is a diagram for illustrating a method for determining switching of the left and right feet of a subject.
Figure 23:
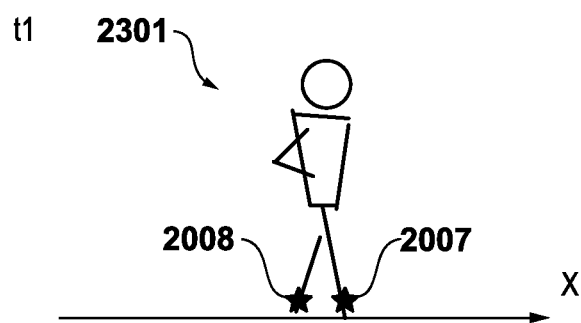

FIG. 23 is a diagram illustrating a method for determining switching of positions of the left and right feet of the subject.

An image 2300 shows the subject standing upright (still) at time to. The right heel 2007 and the left heel 2008 are the joint points of the subject's feet. Here, the right heel 2007 and the left heel 2008 respectively indicate the positions of the "right" heel and the "left" heel viewed from the subject. At this time, the relationship of "the x-axis coordinate of the right heel 2007<the x-axis coordinate of the left heel 2008" holds true. Note that it is assumed that the subject starts walking in the x-axis direction after time to.

An image 2301 shows a state in which switching of the positions of the left and right feet of the subject occurs at time t1. The switching of the positions of the left and right feet of the subject means that the positions of the right foot and the left foot are switched, and specifically means that the x-axis coordinate of the right heel 2007 and becomes larger than the x-axis coordinate of the left heel 2008. At this time, the relationship of "the x-axis coordinate of the right heel 2007>the x-axis coordinate of the left heel 2008" holds true. The motion determination unit 309 can determine the start of movement of the subject based on the magnitude relationship between the x-axis coordinates of the right heel 2007 and the left heel 2008 (i.e., the switching of the positions of the left and right feet of the subject). Note that the motion determination unit 309 uses the position information of the left and right heels of the subject to determine the switching of the positions of the left and right feet of the subject. However, if the position information of the left and right heels cannot be acquired based on the estimation result of the orientation estimation unit 308, the motion determination unit 309 may use the position information of the subject's left and right knees or the like as a substitute for the position information of the subject's left and right heels. For example, the orientation estimation unit 308 may output the reliability estimated for each part (joint point) of the subject, and may select a part (joint point) other than the left and right heels of the subject according to the level of the output reliability for each part of the subject.

In a movement start motion of the subject (that is, a walking motion), positions of the left and right feet of the subject are switched. For this reason, if the change in the positional information of the left and right feet is used to determine the start of movement of the subject, the accuracy of determining the start of movement of the subject is improved. Upon detecting the switching of positions of the left and right feet of the subject, the region setting unit 310 disables the dead zone region of the image capture range. Then, the control unit 313 immediately performs PTZ control according to the movement of the subject. This makes it possible to continue shooting the subject such that the subject remains within the image capture range.

Sixth Embodiment

In the fifth embodiment, an example was described in which the dead zone region is changed (specifically, disabled) and the control unit 313 immediately performs PTZ control when the movement start motion of the subject is detected. In particular, a method of detecting switching of positions of the left and right feet of the subject for detecting the movement start motion of the subject was described. In the sixth embodiment, a method using an inference model will be described in order to detect the movement start motion of the subject. The motion determination unit 309 has an inference model that has learned positive and negative examples of the movement start motion of the subject. For this reason, the motion determination unit 309 has a function of outputting whether or not the subject has started to move, based on joint movement information as orientation information of the subject. When the inference result of the inference model of the motion determination unit 309 indicates that the subject has started to move, the region setting unit 310 changes (specifically, disables) the dead zone region of the image capture range, and the control unit 313 instantly performs PTZ control of the camera.

Figure 24:
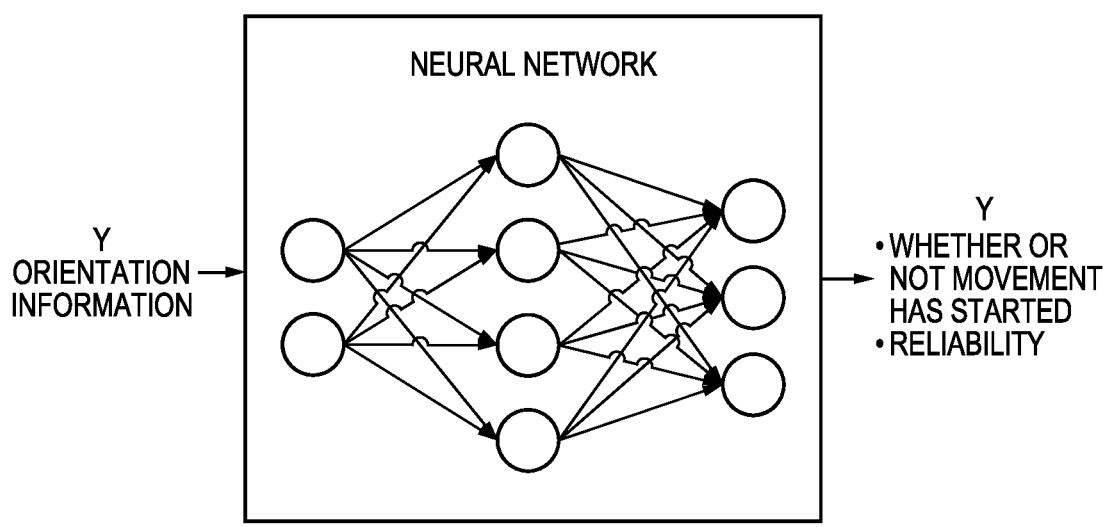
FIG. 24 is a schematic diagram for illustrating an inference model of a motion determination unit 309.

FIG. 24 is a schematic diagram illustrating an inference model of the motion determination unit 309.

The inference model is an inference model unique to this embodiment. When orientation information is input to the inference model as an input value X, the inference model outputs whether or not the subject has started to move (whether or not movement has started) as an output value Y, and a reliability. Note that in this embodiment, orientation information is input to the inference model in chronological order, and the inference model estimates whether or not the subject has started moving. The present embodiment uses, for example, a machine learning technique capable of handling time-series information, such as an RNN (Recurrent Neural Network) and an LSTM (Long Short-Term Memory), which are known techniques.

Figure 25A:
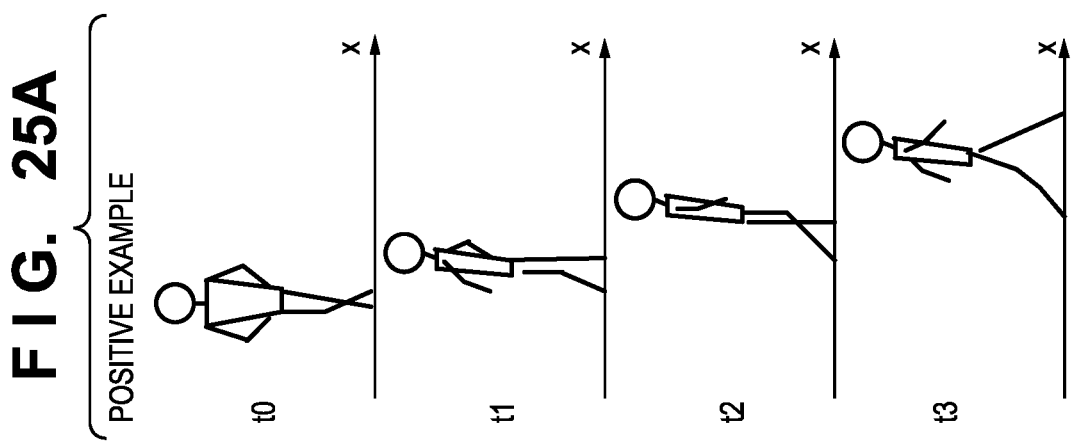
FIG. 25A is a diagram showing an example of training data for training an inference model.
Figure 25B:
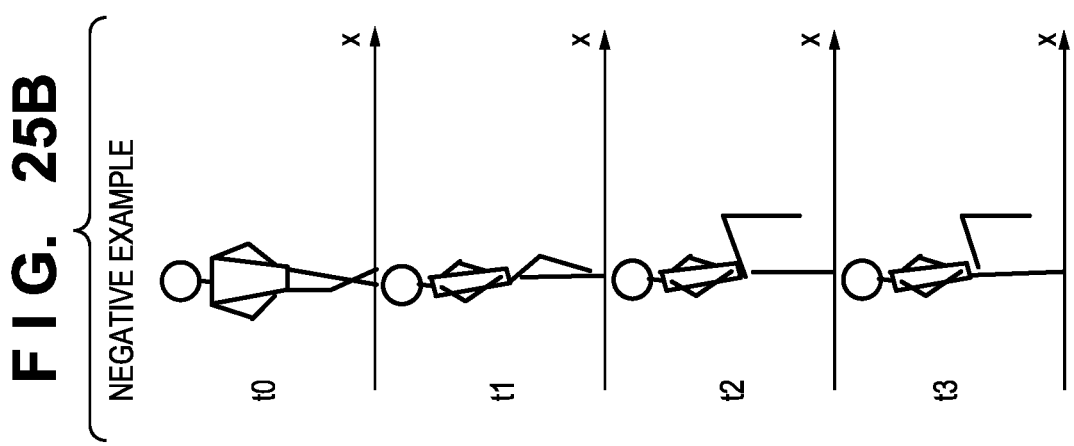
FIG. 25B is a diagram showing an example of training data for training an inference model.
Figure 25C:
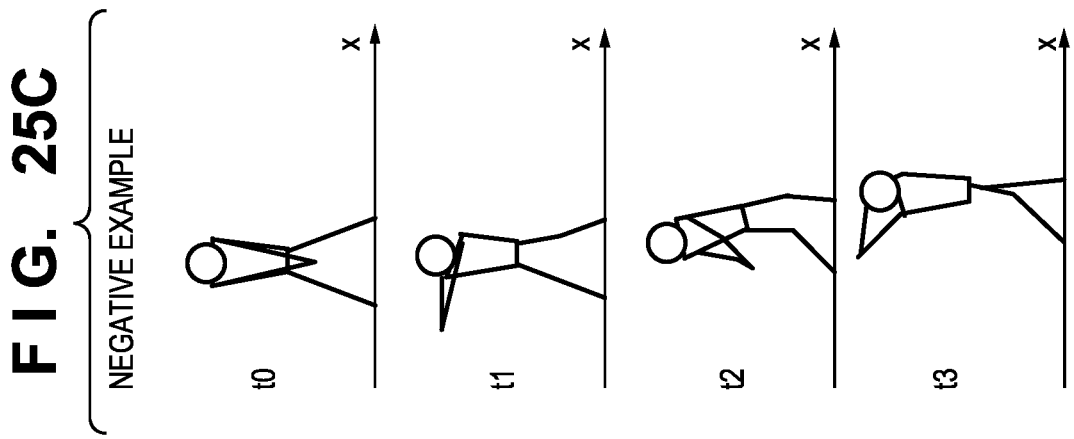
FIG. 25C is a diagram showing an example of training data for training an inference model.

FIGS. 25A to 25C are diagrams showing an example of training data for training an inference model. FIG. 25A is training data of a positive example indicating that the subject has started moving, and shows orientation information of the subject moving (walking) in the X-axis direction at times t0 to t3.

FIGS. 25B and 25C are training data of negative examples indicating that the subject has not started moving. FIG. 25B shows orientation information that captures how the subject is stepping on a spot at times t0 to t3. FIG. 25C shows orientation information that captures how the subject performs a golf swing at times t0 to t3.

The inference model learns whether or not the subject has started moving based on the training data of FIGS. 25A to 25C as the input value X. In this manner, by training the inference model using training data including positive and negative examples, the inference model can extract features related to the movement of the subject, such as changes in the coordinates of the center of gravity included in the orientation information, and the inference model can determine whether or not movement has started with high accuracy.

Figure 26:
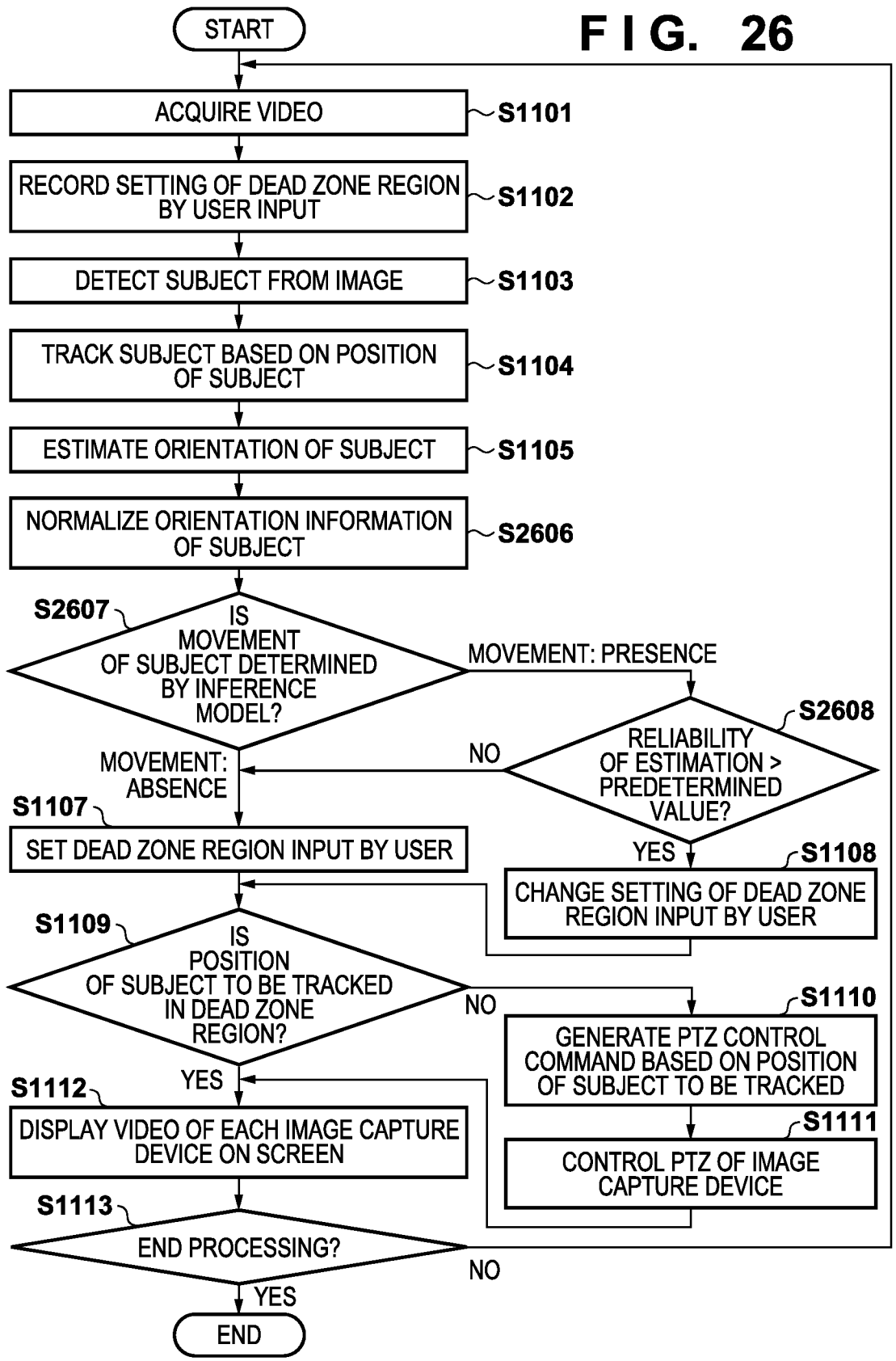
FIG. 26 is a flowchart for illustrating processing of an automatic shooting system according to a sixth embodiment.

FIG. 26 is a flow chart illustrating processing of the automatic shooting system according to the sixth embodiment. Note that the processing of steps S1101 to S1105 and steps S1107 to S1113 are the same as those of the first embodiment, and therefore description thereof will be omitted.

In step S2606, the motion determination unit 309 normalizes the input orientation information of the subject. When the size of the subject in the captured video is small, the length between the coordinates of one joint point and another joint point calculated based on the orientation information is also short, and therefore the joint points of the subject are located close to each other. If orientation information with joint points located close to each other is input to the inference model, there is a possibility that the inference accuracy of the inference model regarding whether or not the subject has started to move will deteriorate. Accordingly, the motion determination unit 309 normalizes the distance between joint points of a predetermined combination such that a predetermined length is achieved. It is preferable to adopt a combination of parts (joint points) according to which the distance between the parts (joint points) does not change due to individual differences. For example, in FIG. 20, the motion determination unit 309 determines the coordinates (position) of each joint point such that a straight line between the right shoulder 2001 and the left shoulder 2002 and a line of the nose 2009 perpendicular to the above-described straight line have predetermined lengths. As a result, it is possible to improve the inference accuracy of the inference model regarding whether or not the subject has started to move.

In step S2607, the motion determination unit 309 inputs normalized orientation information (that is, orientation information in which the positions of the joint points are corrected) to the inference model, and obtains an inference result as to whether or not the subject has started moving and the reliability of the inference result as outputs of the inference model. When the motion determination unit 309 determines that the output result of the inference model indicates that the subject has started moving, the processing proceeds to step S2608. On the other hand, when the motion determination unit 309 determines that the output of the inference model indicates that the subject has not started moving, the processing proceeds to step S1107.

In step S2608, if the motion determination unit 309 determines that the output result of the inference model indicates that the reliability that the subject has started moving is higher than a predetermined value (Yes in step S2608), the processing proceeds to step S1108.

In step S1108, the motion determination unit 309 disables the setting of the dead zone region even if there is a setting of the dead zone region input by the user. Accordingly, in step S1109, the motion determination unit 309 determines that the subject is not in the dead zone region, and the control unit 313 immediately performs PTZ control according to the movement of the subject.

In step S2608, if the motion determination unit 309 determines that the output result of the inference model indicates that the reliability that the subject has started moving is lower than a predetermined value (No in step S2608), the processing proceeds to step S1107. In this case, the control unit 313 suppresses the PTZ control based on the setting of the dead zone region input by the user. Note that in the present embodiment, when the reliability that the subject has started moving is lower than a predetermined value, it is determined that the subject has not started moving. Here, if priority is given to suppressing unnecessary PTZ control, the predetermined value may be set high. On the other hand, if priority is given to following fast movement of the subject, the predetermined value may be set low. Input unit may be provided which allows the user to set a predetermined value as appropriate.

The inference model can infer whether or not the subject is moving based on the normalized orientation information. If the inference result of the inference model is used to determine the start of movement, the accuracy of determining the start of movement of the subject can be further improved. The region setting unit 310 disables the dead zone region of the image capture range when the inference model outputs an inference result indicating that the subject has started moving. Then, the control unit 313 immediately performs PTZ control according to the movement of the subject. This makes it possible to continue shooting the subject such that the subject remains within the image capture range.

Note that the method for detecting the start of movement of the subject according to the fifth and sixth embodiments has been described on the premise that dead zone region control is performed when the subject is automatically tracked. On the other hand, the method for detecting the start of movement of the subject may also be used for switching from the manual PTZ operation mode to the automatic tracking mode. For example, if the start of movement of the subject is detected while the user is manually operating the PTZ using a controller (not shown), the PTZ operation mode may be switched to a subject automatic tracking mode.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-084728, filed May 24, 2022, Japanese Patent Application No. 2023-008954, filed Jan. 24, 2023, which are hereby incorporated by reference herein in their entirety.

What is claimed is:

1. An image capture control device configured to control an image capture direction of an image capture device for capturing an image of a subject, comprising:
at least one processor; and
at least one memory coupled to the at least one processor, the memory storing instructions that, when executed by the processor, cause the processor to act as:
estimation unit configured to estimate an orientation of the subject detected in an image captured by the image capture device;
region control unit configured to set a first region in an image capture range of the image capture device based on whether or not the estimated orientation of the subject is a predetermined orientation;
image capture control unit configured to control the image capture direction based on whether or not the subject is in the first region;
acceleration control unit configured to control acceleration when changing the image capture direction based on whether or not the orientation of the subject is the predetermined orientation; and
wherein if an amount of time for which the orientation of the subject continues to be the predetermined orientation is less than or equal to a threshold, the region control unit performs control for reducing the size of the first region, and
if the amount of time is less than or equal to the threshold, the acceleration control unit performs control for increasing the acceleration when changing the image capture direction.

2. The image capture control device according to claim 1, wherein a size of the first region is greater when the orientation of the subject is not the predetermined orientation, compared to when the orientation of the subject is the predetermined orientation.

3. The image capture control device according to claim 1, wherein the estimation unit estimates joint points of the subject based on a position of the detected subject, and
the region control unit sets the first region based on comparison between a threshold and a direction of a line connecting the joint points or a slope of an axis passing through a center of the subject with respect to a ground surface.

4. The image capture control device according to claim 1, wherein the region control unit sets the first region based on whether or not a height from a ground surface to a center of gravity of the subject is lower than a threshold.

5. The image capture control device according to claim 1, wherein the region control unit sets the first region based on whether or not a face direction or a line-of-sight direction of the subject is a predetermined direction.

6. The image capture control device according to claim 5, wherein the predetermined direction is a direction in which the face direction or the line-of-sight direction of the subject is directed outside of the image capture range.

7. The image capture control device according to claim 1, wherein if an amount of time for which the orientation of the subject continues to be the predetermined orientation exceeds a threshold, the region control unit performs control for reducing the size of the first region based on whether or not the distance by which the subject moves in the amount of time is greater than or equal to a threshold, and
if the amount of time exceeds a threshold, the acceleration control unit performs control for increasing the acceleration when changing the image capture direction based on whether or not the distance is greater than or equal to the threshold.

8. The image capture control device according to claim 1, the instructions, when executed by the processor, further cause the processor to act as: detection unit configured to detect the subject in the image.

9. An image capture device comprising:
image capture unit configured to capture an image of a subject in an image capture direction controlled by image capture control unit, and
the image capture control device according to claim 1.

10. An image capture control method configured to control an image capture direction of an image capture device for capturing an image of a subject, comprising:
- estimating an orientation of the subject detected in an image captured by the image capture device;
- setting a first region in an image capture range of the image capture device based on whether or not the estimated orientation of the subject is a predetermined orientation;
- controlling the image capture direction based on whether or not the subject is in the first region;
- controlling acceleration when changing the image capture direction based on whether or not the orientation of the subject is the predetermined orientation; and
- wherein if an amount of time for which the orientation of the subject continues to be the predetermined orientation is less than or equal to a threshold, performing control for reducing the size of the first region, and
- if the amount of time is less than or equal to the threshold, performing control for increasing the acceleration when changing the image capture direction.

11. A non-transitory computer-readable storage medium storing instructions that, when executed by a computer, cause the computer to perform an image capture control method comprising:
- estimating an orientation of the subject detected in an image captured by the image capture device;
- setting a first region in an image capture range of the image capture device based on whether or not the estimated orientation of the subject is a predetermined orientation;
- controlling the image capture direction based on whether or not the subject is in the first region;
- controlling acceleration when changing the image capture direction based on whether or not the orientation of the subject is the predetermined orientation; and
- wherein if an amount of time for which the orientation of the subject continues to be the predetermined orientation is less than or equal to a threshold, performing control for reducing the size of the first region, and
- if the amount of time is less than or equal to the threshold, performing control for increasing the acceleration when changing the image capture direction.

* * * * *